US008725345B2

(12) United States Patent
de Oliveira et al.

(10) Patent No.: US 8,725,345 B2
(45) Date of Patent: May 13, 2014

(54) INFORMATION SYSTEM FOR INDUSTRIAL VEHICLES

(71) Applicants: Sergio Schulte de Oliveira, Troy, OH (US); Benjamin J. Purrenhage, New Bremen, OH (US); Philip W. Swift, Dayton, OH (US); David K. Tinnerman, New Knoxville, OH (US); Jeffrey C. Whitford, Troy, OH (US)

(72) Inventors: Sergio Schulte de Oliveira, Troy, OH (US); Benjamin J. Purrenhage, New Bremen, OH (US); Philip W. Swift, Dayton, OH (US); David K. Tinnerman, New Knoxville, OH (US); Jeffrey C. Whitford, Troy, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 14/069,440

(22) Filed: Nov. 1, 2013

(65) Prior Publication Data

US 2014/0058616 A1    Feb. 27, 2014

Related U.S. Application Data

(63) Continuation of application No. 12/854,971, filed on Aug. 12, 2010, now Pat. No. 8,583,314.

(60) Provisional application No. 61/233,394, filed on Aug. 12, 2009.

(51) Int. Cl.
*G06Q 10/00* (2012.01)
*G06F 7/00* (2006.01)
*G06F 15/16* (2006.01)

(52) U.S. Cl.
USPC ........ 701/29.5; 701/29.2; 701/31.4; 701/468; 709/219

(58) Field of Classification Search
USPC ................ 701/29.5, 29.2, 31.4, 468; 709/219
See application file for complete search history.

(56) References Cited

U.S. PATENT DOCUMENTS

| 4,009,375 | A | 2/1977 | White et al. |
| 4,251,813 | A | 2/1981 | Carre |
| 4,258,421 | A | 3/1981 | Juhasz et al. |
| 4,612,620 | A | 9/1986 | Davis et al. |
| 4,638,289 | A | 1/1987 | Zottnik |
| 4,677,429 | A | 6/1987 | Glotzbach |

(Continued)

FOREIGN PATENT DOCUMENTS

| EP | 0416171 A2 | 3/1991 |
| EP | 2033933 A2 | 3/2009 |

(Continued)

OTHER PUBLICATIONS

Drive Down Your Total Cost of Ownership; Powerkey Fleet Management Systems; Doc. #5001, Rev. #1.0 Oct. 04, International Electronics, Inc.; Canton, MA.

(Continued)

*Primary Examiner* — Thomas Black
*Assistant Examiner* — Wae Louie
(74) *Attorney, Agent, or Firm* — Stevens & Showalter LLP

(57) ABSTRACT

Industrial vehicles communicate across a wireless environment where the wireless communication, data collection and/or processing capabilities of industrial vehicles are utilized to implement dashboard functions that thread status information from detail level views, up through intermediate views and to summary level views to facilitate efficient fleet maintenance, management and control. Further, industrial vehicle data may be communicated to a trusted third party server. As such, wirelessly collected industrial vehicle information is utilized within applications that aggregate and analyze data across multiple enterprises.

20 Claims, 12 Drawing Sheets

(56) References Cited

U.S. PATENT DOCUMENTS

| | | |
|---|---|---|
| 4,728,922 A | 3/1988 | Christen et al. |
| 4,757,712 A | 7/1988 | Jurca |
| 4,949,263 A | 8/1990 | Jurca |
| 5,058,044 A | 10/1991 | Stewart et al. |
| 5,173,856 A | 12/1992 | Pumell et al. |
| 5,257,190 A | 10/1993 | Crane |
| 5,267,147 A | 11/1993 | Harshaw et al. |
| 5,289,378 A | 2/1994 | Miller et al. |
| 5,442,553 A | 8/1995 | Parrillo |
| 5,454,074 A | 9/1995 | Hartel et al. |
| 5,457,629 A | 10/1995 | Miller et al. |
| 5,465,207 A | 11/1995 | Boatwright et al. |
| 5,513,111 A | 4/1996 | Wortham |
| 5,513,242 A | 4/1996 | Mukerjee et al. |
| 5,526,269 A | 6/1996 | Ishibashi et al. |
| 5,590,057 A | 12/1996 | Fletcher et al. |
| 5,625,555 A | 4/1997 | Davis |
| 5,650,928 A | 7/1997 | Hagenbuch |
| 5,660,246 A | 8/1997 | Kaman |
| 5,671,436 A | 9/1997 | Morris et al. |
| 5,680,328 A | 10/1997 | Skorupski et al. |
| 5,682,142 A | 10/1997 | Loosmore et al. |
| 5,694,318 A | 12/1997 | Miller et al. |
| 5,710,566 A | 1/1998 | Grabow et al. |
| 5,712,625 A | 1/1998 | Murphy |
| 5,714,946 A | 2/1998 | Gottshall et al. |
| 5,715,905 A | 2/1998 | Kaman |
| 5,737,215 A | 4/1998 | Schricker et al. |
| 5,740,035 A | 4/1998 | Cohen et al. |
| 5,747,786 A | 5/1998 | Cargin, Jr. et al. |
| 5,781,871 A | 7/1998 | Mezger et al. |
| 5,802,545 A | 9/1998 | Coverdill |
| 5,838,251 A | 11/1998 | Brinkmeyer et al. |
| 5,844,473 A | 12/1998 | Kaman |
| 5,873,070 A | 2/1999 | Bunte et al. |
| 5,890,086 A | 3/1999 | Wellman et al. |
| 5,895,431 A | 4/1999 | Miller et al. |
| 5,904,727 A | 5/1999 | Prabhakaran |
| 5,928,292 A | 7/1999 | Miller et al. |
| 5,948,026 A | 9/1999 | Beemer, II et al. |
| 5,966,658 A | 10/1999 | Kennedy, III et al. |
| 5,969,433 A | 10/1999 | Maggiora et al. |
| 5,987,499 A | 11/1999 | Morris et al. |
| 6,028,537 A | 2/2000 | Suman et al. |
| 6,112,206 A | 8/2000 | Morris et al. |
| 6,195,605 B1 | 2/2001 | Tabler et al. |
| 6,212,449 B1 | 4/2001 | Wellman et al. |
| 6,240,365 B1 | 5/2001 | Bunn |
| 6,292,437 B1 | 9/2001 | Beard |
| 6,295,492 B1 | 9/2001 | Lang et al. |
| 6,339,745 B1 | 1/2002 | Novik |
| 6,411,203 B1 | 6/2002 | Lesesky et al. |
| 6,417,760 B1 | 7/2002 | Mabuchi et al. |
| 6,430,485 B1 | 8/2002 | Hullinger |
| 6,532,416 B1 | 3/2003 | Mueller |
| 6,584,403 B2 | 6/2003 | Bunn |
| 6,662,068 B1 | 12/2003 | Ghaffari |
| 6,671,622 B2 | 12/2003 | McCall et al. |
| 6,714,857 B2 | 3/2004 | Kapolka et al. |
| 6,744,436 B1 | 6/2004 | Chirieleison, Jr. et al. |
| 6,754,562 B2 | 6/2004 | Strege et al. |
| 6,799,099 B2 | 9/2004 | Zeitler et al. |
| 6,804,626 B2 * | 10/2004 | Manegold et al. ............ 702/182 |
| 6,810,406 B2 | 10/2004 | Schlabach et al. |
| 6,816,063 B2 | 11/2004 | Kubler et al. |
| 6,832,139 B2 | 12/2004 | Johnson et al. |
| 6,859,697 B2 * | 2/2005 | Muragishi .................. 701/29.2 |
| 6,862,443 B2 | 3/2005 | Witte |
| 6,865,436 B2 | 3/2005 | O'Connor et al. |
| 6,873,909 B2 | 3/2005 | Borugian |
| 6,892,131 B2 | 5/2005 | Coffee et al. |
| 6,898,493 B2 | 5/2005 | Ehrman et al. |
| 6,952,680 B1 | 10/2005 | Malby et al. |
| 7,062,446 B1 | 6/2006 | Suhy, Jr. et al. |
| 7,117,075 B1 | 10/2006 | Larschan et al. |
| 7,152,035 B1 | 12/2006 | Suhy, Jr. |
| 7,165,040 B2 | 1/2007 | Ehrman et al. |
| 7,171,381 B2 | 1/2007 | Ehrman et al. |
| 7,356,494 B2 | 4/2008 | Ehrman et al. |
| 7,387,243 B2 | 6/2008 | Magens et al. |
| 7,395,275 B1 | 7/2008 | Parent |
| 7,460,016 B2 | 12/2008 | Sorenson, Jr. et al. |
| 7,706,938 B2 | 4/2010 | Palladino |
| 2001/0018628 A1 | 8/2001 | Jenkins et al. |
| 2001/0018639 A1 | 8/2001 | Bunn |
| 2001/0037298 A1 | 11/2001 | Ehrman et al. |
| 2002/0077944 A1 | 6/2002 | Bly et al. |
| 2002/0082966 A1 | 6/2002 | O'Brien et al. |
| 2002/0087345 A1 | 7/2002 | Bly et al. |
| 2002/0089434 A1 | 7/2002 | Ghazarian |
| 2002/0107873 A1 | 8/2002 | Winkler et al. |
| 2002/0173910 A1 | 11/2002 | McCall et al. |
| 2002/0186144 A1 | 12/2002 | Meunier |
| 2002/0193910 A1 | 12/2002 | Strege et al. |
| 2003/0028323 A1 | 2/2003 | Zeitler et al. |
| 2003/0114980 A1 | 6/2003 | Klausner et al. |
| 2003/0130913 A1 | 7/2003 | Ehrman et al. |
| 2003/0141964 A1 | 7/2003 | Su et al. |
| 2003/0163249 A1 | 8/2003 | Kapolka et al. |
| 2003/0195825 A1 | 10/2003 | Ehrman et al. |
| 2003/0216976 A1 | 11/2003 | Ehrman et al. |
| 2003/0225707 A1 | 12/2003 | Ehrman et al. |
| 2003/0233177 A1 | 12/2003 | Johnson et al. |
| 2004/0015419 A1 | 1/2004 | Ehrman et al. |
| 2004/0039504 A1 | 2/2004 | Coffee et al. |
| 2004/0049324 A1 * | 3/2004 | Walker .............................. 701/1 |
| 2004/0085195 A1 | 5/2004 | McKibbon |
| 2004/0093109 A1 | 5/2004 | O'Connor et al. |
| 2004/0093291 A1 | 5/2004 | Bodin |
| 2004/0102869 A1 | 5/2004 | Anderson et al. |
| 2004/0106376 A1 | 6/2004 | Forster |
| 2004/0139806 A1 | 7/2004 | Christmas |
| 2004/0262387 A1 * | 12/2004 | Hart .............................. 235/384 |
| 2005/0002354 A1 | 1/2005 | Kelly et al. |
| 2005/0029872 A1 | 2/2005 | Ehrman et al. |
| 2005/0049021 A1 | 3/2005 | Nedelcu et al. |
| 2005/0052281 A1 | 3/2005 | Bann |
| 2005/0065861 A1 | 3/2005 | Bann |
| 2005/0086239 A1 | 4/2005 | Swann et al. |
| 2005/0108089 A1 | 5/2005 | Ehrman et al. |
| 2005/0131729 A1 | 6/2005 | Melby et al. |
| 2005/0240378 A1 | 10/2005 | Smith et al. |
| 2006/0053075 A1 | 3/2006 | Roth et al. |
| 2006/0111822 A1 * | 5/2006 | Simon .............................. 701/29 |
| 2006/0142913 A1 | 6/2006 | Coffee et al. |
| 2006/0208890 A1 | 9/2006 | Ehrman et al. |
| 2006/0208891 A1 | 9/2006 | Ehrman et al. |
| 2006/0208892 A1 | 9/2006 | Ehrman et al. |
| 2006/0229906 A1 | 10/2006 | Suhy, Jr. et al. |
| 2007/0208476 A1 | 9/2007 | Baginski et al. |
| 2007/0208477 A1 | 9/2007 | Baginski et al. |
| 2007/0213897 A1 | 9/2007 | Estes et al. |
| 2007/0229251 A1 | 10/2007 | Ehrman et al. |
| 2007/0239292 A1 | 10/2007 | Ehrman et al. |
| 2007/0239324 A1 | 10/2007 | Ehrman et al. |
| 2007/0290840 A1 | 12/2007 | Ehrman et al. |
| 2008/0015955 A1 | 1/2008 | Ehrman et al. |
| 2008/0068170 A1 | 3/2008 | Ehrman et al. |
| 2008/0068171 A1 | 3/2008 | Ehrman et al. |
| 2008/0136584 A1 | 6/2008 | Ehrman et al. |
| 2008/0140440 A1 | 6/2008 | Ehrman et al. |
| 2008/0140482 A1 | 6/2008 | Ehrman et al. |
| 2008/0140483 A1 | 6/2008 | Ehrman et al. |
| 2008/0140544 A1 | 6/2008 | Ehrman et al. |
| 2008/0154691 A1 | 6/2008 | Wellman et al. |
| 2008/0154712 A1 | 6/2008 | Wellman |
| 2008/0183522 A1 | 7/2008 | Ehrman et al. |
| 2008/0228346 A1 | 9/2008 | Lucas et al. |
| 2009/0037206 A1 | 2/2009 | Byrne et al. |
| 2010/0039247 A1 | 2/2010 | Ziegler et al. |
| 2010/0228428 A1 * | 9/2010 | Harshbarger et al. ............ 701/33 |
| 2010/0324962 A1 * | 12/2010 | Nesler et al. ...................... 705/8 |
| 2011/0022442 A1 * | 1/2011 | Wellman et al. .................. 705/9 |
| 2011/0040440 A1 * | 2/2011 | de Oliveira et al. ............. 701/30 |

(56) References Cited

U.S. PATENT DOCUMENTS

| | | | |
|---|---|---|---|
| 2011/0047418 A1* | 2/2011 | Drees et al. | 714/57 |
| 2011/0061015 A1* | 3/2011 | Drees et al. | 715/771 |
| 2012/0022700 A1* | 1/2012 | Drees et al. | 700/276 |

FOREIGN PATENT DOCUMENTS

| | | | |
|---|---|---|---|
| GB | 2288050 A | | 10/1995 |
| GB | 2352521 A | | 1/2001 |
| KR | 1020060055517 A | | 5/2006 |
| KR | 1020090013529 A | | 2/2009 |
| WO | 0070530 | | 11/2000 |
| WO | 0137118 A2 | | 5/2001 |
| WO | 0137121 A2 | | 5/2001 |
| WO | 03042891 A1 | | 5/2003 |
| WO | 03061248 A2 | | 7/2003 |
| WO | 2004104941 A2 | | 12/2004 |
| WO | 2004112403 A2 | | 12/2004 |
| WO | 2006022609 A1 | | 3/2006 |

OTHER PUBLICATIONS

Asset Communicator-Magnetic Card Reader; I.D. Systems, Inc.
Vehicle Asset Communicator-Weatherproof 20-Key Keypad; I.D. Systems, Inc.
Softwaresystem-Industrial Fleet Management; I.D. Systems, Inc.
Smith, Greg; Wireless Management of Industrial Vehicles; Industrial Utility Vehicle & Mobile Equipment; Mar./Apr. 2004, vol. 6, Issue 2; Webcom Communications Corp.
SD I System, Truck Log; Jun. 2003; TL001; Davis Derby Limited; Derby England.
Easyview Direct 2 System Fleet Management-Monitor, Measure & Control, Truck Log; Jun. 2003; TL004; Davis Derby Limited; Derby England.
Airport Vehicle Drive Access Control System, Truck Log; Sep. 2004; TL005; Davis Derby Limited; Derby England.
In the Driving Seat; Toyota Industrial Equipment; Jun. 2005.
Futuristic Fleet for Contract Foods; Yale Europe; Jun. 10, 2008; Material Handling World.
Keytroller Systems: Risk Minimisation in Forklift Operations; Forklift Action.Com; May 18, 2007; Newsletter #311.
Fleet Management Systems; Forklift Action.Com; May 24, 2007; Newsletter #311.
J.C. Fuentes Michel et al.; A Novell Wireless Forklift Positioning System for Indoor and Outdoor Use; Proceedings of the 5th Workshop on Positioning, Navigation and Communication 2008; (WPNC '08); pp. 219-227.
Indoor Tracking Technology Demonstration Successful; Forklift Action.Com; Oct. 9, 2008; Newsletter #381.
New System for Remote Monitoring; Forklift Action.Com; Sep. 3, 2008; Newsletter #376.
RFID Technology and Personnel Protection System in Jungheinrich's EKX 513-515 Turret Trucks Mean Much Greater Efficiency and Safety; Jungheinrich-us.com; Nov. 24, 2008.
Athina Nickitas-Etienne; International Preliminary Report on Patentability and Written Opinion of the International Searching Authority; International Application No. PCT/US2007/087440; Jun. 16, 2009; International Bureau of WIPO; Geneva Switzerland.
Mohammad R. Ullah Masud; Office Action—Non-Final Rejection in U.S. Appl. No. 11/956,022; Sep. 1, 2010; U.S. Patent and Trademark Office; Alexandria, VA.
U.S. Appl. No. 12/871,001, filed Aug. 30, 2010 entitled, "Information System for Industrial Vehicles Including Cyclical Recurring Vehicle Information Message".
Jae Gwi Choi; International Search Report and Written Opinion of the International Searching Authority; International Application No. PCT/US2010/029327; Oct. 28, 2010; Korean Intellectual Property Office.
Jae Gwi Choi; International Search Report and Written Opinion of the International Searching Authority; International Application No. PCT/US2010/045267; Apr. 27, 2011; Korean Intellectual Property Office.
Jae Gwi Choi; International Search Report and Written Opinion of the International Searching Authority; International Application No. PCT/US2010/047090; Apr. 27, 2011; Korean Intellectual Property Office.
Mohammad R. Ullah Masud; Final Office Action in U.S. Appl. No. 11/956,022; Feb. 16, 2011; U.S. Patent and Trademark Office; Alexandria, VA.
Office Action issued in Chinese Application No. 200780051076.6; Feb. 23, 2011; State Intellectual Property Office of the People's Republic of China.
Mohammad R. Ullah Masud; Non-final Office Action in U.S. Appl. No. 11/956,045; Mar. 1, 2011; U.S. Patent and Trademark Office; Alexandria, VA.
Chinese Application No. 201080035387.4; Second Office Action dated Oct. 10, 2013; State Intellectual Property Office of the People's Republic of China; Beijing, China.
Bolton, Henry; Patent Examination Report No. 1; Australian Patent Application No. 2010282536; Dec. 19, 2013; Australian Government, IP Australia; Woden, ACT.

* cited by examiner

INFORMATION SYSTEM FOR INDUSTRIAL VEHICLES

CROSS-REFERENCE TO RELATED APPLICATIONS

This application is a continuation of U.S. patent application Ser. No. 12/854,971, entitled INFORMATION SYSTEM FOR INDUSTRIAL VEHICLES, filed Aug. 12, 2010, now allowed, which claims the benefit of to U.S. Provisional Patent Application No. 61/233,394, filed on Aug. 12, 2009 and entitled INFORMATION SYSTEM FOR INDUSTRIAL VEHICLES, the contents of which are incorporated herein by reference in their entirety.

BACKGROUND OF THE INVENTION

Wireless strategies may be deployed by business operations, including for example, warehousing facilities, distribution centers, retail stores, manufacturing facilities, etc., to improve the efficiency and accuracy of business operations. Wireless strategies may also be deployed by such business operations to avoid the effects of constantly increasing labor and logistics costs. In a typical wireless implementation, workers are linked to a customized software application executing on a corresponding computer system via a mobile wireless transceiver, such as a hand-held device. The wireless transceiver may be used as an interface to the customized software application to direct workers in their tasks, e.g., by instructing workers where and/or how to pick, pack, put away, move, stage, process or otherwise manipulate the items within the facility. The wireless transceiver may also be used in conjunction with a suitable input device to scan, sense or otherwise read tags, labels such as barcode labels or other identifiers to track the movement of designated items within the facility.

In order to move items about a facility, workers often utilize industrial vehicles, including for example, forklift trucks, hand and motor driven pallet trucks, and/or other materials handling vehicles. However, disruptions in the operation of such industrial vehicles impact the ability of the management system and corresponding wireless strategy to obtain peak operating efficiency. Moreover, conventional enterprise software, including the above-described customized software applications, do not account for, track, communicate with or otherwise provide insight into the availability, health, status or suitability of the industrial vehicles to perform the required work. Still further, conventional enterprise software, including corresponding management systems do not provide tools to manage access to, and operation of, the available industrial vehicles within the facility in an efficient and integrated manner.

BRIEF SUMMARY OF THE INVENTION

According to aspects of the present disclosure, a method for monitoring usage metrics of industrial vehicles is provided. The method comprises receiving wirelessly communicated information from a plurality of industrial vehicles, and storing the received information in a storage accessible by a server computer. The method also comprises utilizing an organizational structure to organize the received information. The organizational structure comprises a summary level, an intermediate level and a detail level. The summary level has a summary level category that defines a subject matter related to the management of industrial vehicles. The intermediate level has at least two intermediate level categories, each intermediate level category organized as a sub-category that further defines subject matter corresponding with the summary level category. The detail level has at least one detail level metric corresponding with each intermediate level category, where each detail level metric defines subject matter associated with the corresponding sub-category.

The method further comprises storing a benchmark value assigned for a particular detail level metric. The method also comprises associating a summary status indicator with the summary level category and associating an intermediate status indicator with each intermediate level category. Still further, the method comprises analyzing, by the server computer, data comprising the received information from the plurality of industrial vehicles against each detail level metric to derive evaluation results, the analysis further comprising comparing the evaluation result of the particular detail level metric against the assigned benchmark.

The method also comprises assigning an intermediate level value to each intermediate status indicator according to the analysis of each associated detail level metric and assigning a summary level value to the summary status indicator according to an evaluation of each corresponding intermediate level status. The method further comprises communicating dashboard information from the server computer to a user interface executing on a client computer such that a user can navigate through the summary level category, the intermediate level categories and the detail level metrics and prioritize fleet management based upon the summary and intermediate status indicator values and the evaluation results.

BRIEF DESCRIPTION OF THE SEVERAL VIEWS OF THE DRAWINGS

The following detailed description of various embodiments of the present invention can be best understood when read in conjunction with the following drawings, where like structure is indicated with like reference numerals, and in which.

DETAILED DESCRIPTION OF THE INVENTION

In the detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

System Architecture

Aspects of the present invention comprise systems that enable industrial vehicles to wirelessly communicate with one or more software applications, e.g., which may be deployed in an enterprise computing environment, and/or other remote computing systems, examples of which are described in greater detail herein. Exemplary industrial vehicles may include forklift trucks, reach trucks, turret trucks, walkie stacker trucks tow tractors, pallet trucks, and/or other materials handling vehicles.

Figure 1:
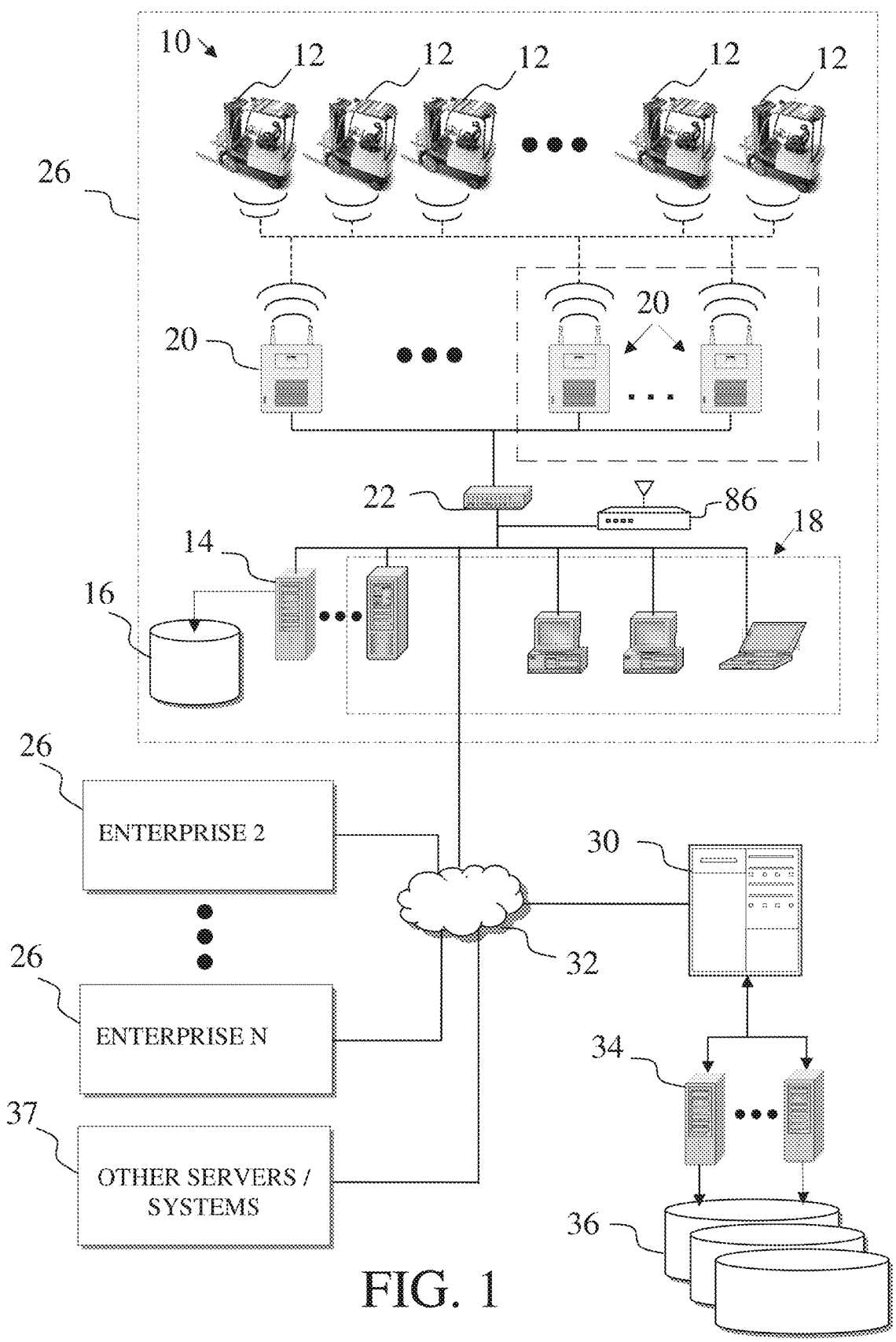
FIG. 1 is a schematic illustration of a wireless communication system that allows mobile devices, such as forklift trucks and other industrial vehicles to wirelessly communicate with a server.

Referring now to the drawings and particularly to FIG. 1, an exemplary computing environment 10 is illustrated, which includes components that support wireless communication capabilities. A plurality of industrial vehicles 12, (shown by way of illustration as a fleet of forklift trucks for convenience of discussion) wirelessly communicate with a processing device, such as a server computer. For example, as illustrated, the plurality of industrial vehicles 12 communicate with a server computer designated herein, as an industrial vehicle application server 14. The industrial vehicle application server 14 may further interact with a data resource 16, e.g., one or more databases, data stores or other sources of information, to facilitate interaction with users of remote computers and with the industrial vehicles 12 as will be described in greater detail herein.

The computing environment 10 may further support additional processing devices 18, which may comprise for example, additional server computers provided to execute other enterprise applications such as email, a warehouse management system (WMS), an Enterprise Resource Planning (ERP) application, etc.

The additional processing devices 18 may also comprise personal computers, notebook computers, transactional systems, appliance or pervasive computing devices such as personal data assistants (PDA), palm computers, cellular access processing devices, special purpose computing devices, network storage devices and/or other devices capable of interacting with the computing environment 10. One or more of the processing devices 18 may also communicate with the industrial vehicles 12 and/or the industrial vehicle application server 14 across the computing environment 10.

The wireless communication architecture may be based upon a standard wireless fidelity (Wi-Fi) infrastructure, such as may be deployed using a standard 802.11 a/b/g wireless network communications protocol. Moreover, communication over the wireless network may utilize security encryption, such as may be implemented using standard or proprietary encryption techniques. However, any other suitable wireless communication architecture, communication protocol and/or security techniques may alternatively be implemented.

In an exemplary illustrated arrangement, one or more wireless access points 20 are utilized to relay data between a wireless transceiver of each industrial vehicle 12 and one or more wired devices of the computing environment 10, e.g., the industrial vehicle application server 14. The number of access points 20 and the placement thereof may be determined based upon the specific implementation. For example, in a relatively large site, e.g., a large warehouse, distribution facility, retail outlet, etc., numerous access points 20 may be required to provide wireless communications coverage across a designated area in which the industrial vehicles 12 are to be operated. Correspondingly, in certain circumstances, a single access point 20 may be utilized. Still further, the vehicle systems described more fully herein can function, e.g., to store, log and otherwise collect data and process information, even in the absence of wireless access to an access point 20.

Moreover, the computing environment 10 may be supported by one or more networking components 22 that interconnect the various hardware and/or software processing devices, including for example, hubs, routers, firewalls, network interfaces and corresponding interconnections. The particular networking components provided in the computing environment 10 may thus be selected to support one or more intranets, extranets, local area networks (LAN), wide area networks (WAN), wireless networks (Wi-Fi), the Internet, including the world wide web, and/or other arrangements for enabling communication across the computing environment 10, either real time or otherwise, e.g., via time shifting, batch processing, etc.

The networking components 22 further allow integration of wireless capability of industrial vehicles 12 across an entire enterprise 26 of a corresponding entity, e.g., a fleet operator. As schematically illustrated, each enterprise 26 represents a computing system of an independent entity, such as a warehouse owner, retailer, distributor, manufacturer or other entity that utilizes a fleet of industrial vehicles 12. As described more fully herein, the fleet of industrial vehicles 12 associated with each entity and correspondingly, each computer enterprise 26, may be maintained in a local computing environment 10 or the enterprise may be organized into a distributed enterprise architecture, for example, wherein several local computing environments or distinct physical locations are connected across a network, such as a LAN, WAN, the Internet, etc. Each local computing environment may represent, for example, one physical or logical location, e.g., warehouse, warehouse region, etc., which collectively form a larger computing enterprise 26, where the enterprise 26 provides some form of common network control or supervision over the associated local computing environments.

In this regard, an entity may have operations at multiple distinct physical site locations, yet the computing systems at each site are controlled by the same entity and are interconnected, capable of communication or are otherwise integrated. Under this configuration, each local site may maintain its own industrial vehicle application server 14, or the enterprise 26 may manage each local site 1-$m$ from a centralized location. As such, the industrial vehicle application server 14 need not reside in the same physical location as the industrial vehicles 12. Rather, data links can be set up using combinations of access points 20, networking components 22 and networks to distribute the fleet of industrial vehicles 12 across the physical locations, e.g., multiple warehouse facilities of the entity enterprise.

One or more computing environments 10, 26 may further communicate with remote servers on a remote server computer 30, e.g., across a network 32 such as the Internet. The remote server computer 30 may comprise, for example, an independently maintained third party server, such as a manufacturer server that is configurable for interaction with the industrial vehicles 12, the industrial vehicle application server 14 and/or other processing devices 18 of the computing environment(s) 10, 26. In this regard, each enterprise 26 may comprise, for example, a customer of the manufacturer. The remote server 30 may further interact with one or more back-end servers 34 and/or data resource 36, e.g., one or more databases, data stores or other sources of information.

As another illustrative example, one or more components of the industrial vehicle application server 14 and/or the data resource 16, e.g., software components, data, etc., may be co-located at an associated enterprise 26 and on the remote server 30. Alternatively, one or more components of the industrial vehicle application server 14 and/or the data resource 16, e.g., software components, data, etc., may be distributed between an associated enterprise 26 and on the remote server 30. As yet another illustrative example, the components of the industrial vehicle application server 14 and/or the data resource 16, e.g., software components, data, etc., may be located on the remote server 30.

Depending upon the particular implementation, data processed, gathered, detected, monitored or otherwise wirelessly transmitted by industrial vehicles 12 may be locally maintained, e.g., by an instance of the industrial vehicle application server 14. This data may also be shared across distinct physical sites of a larger computing enterprise 26. Still further, this data may be shared between sites/enterprises 26, etc., and remote server(s) 30, or entirely maintained by the remote server 30, which may be associated with a trusted third party, such as an industrial vehicle manufacturer. Still further, relevant portions of the data may be shared with or obtained from multiple trusted independent third party servers, e.g. 30, 37.

The present application may further exploit system computer architectures as described more fully in patent application Ser. No. 11/956,022 (Published as US 2008-0154712 A1) entitled "Fleet Management System", filed Dec. 13, 2007, which is hereby incorporated by reference in its entirety. The present application also hereby incorporates by reference, patent application Ser. No. 11/956,045 (Published as US 2008-0154691 A1), entitled "Fleet Management System" filed Dec. 13, 2007, in its entirety. Still further, the present application incorporates by reference, U.S. Provisional Pat. App. No. 61/166,494, entitled "INFORMATION SYSTEM FOR INDUSTRIAL VEHICLES", filed Apr. 3, 2009, in its entirety.

The Vehicle Interface

Figure 2:
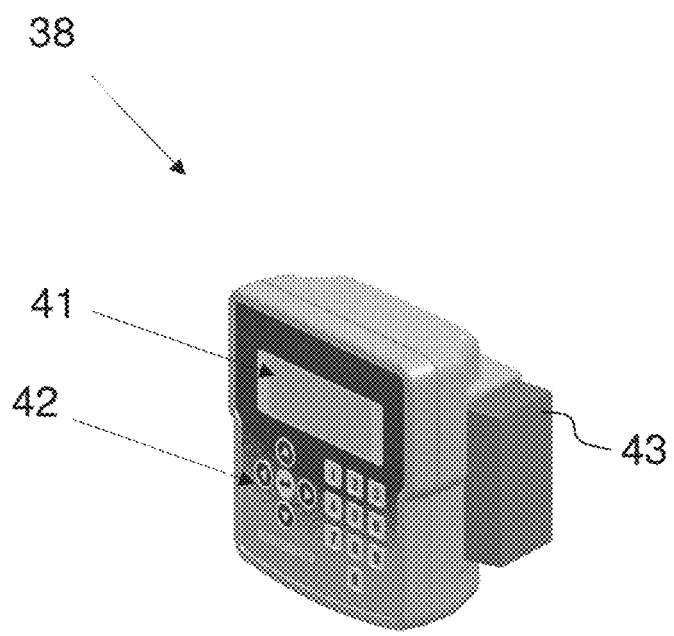
FIG. 2 is an illustration of an information linking device capable of wirelessly communicating data between an industrial vehicle and a corresponding server.

Referring to FIG. 2, an exemplary information linking device 38 is illustrated that provides the wireless interface to the industrial vehicles 12. The information linking device 38 may also serve as in interface that facilitates interaction with the user at the vehicle 12, and is enabled by hardware and software as will be described in greater detail herein. The illustrated information linking device 38 includes, in general, a display 41 and controls 42 for interacting with a user. The information linking device 38 may further include additional features, such as a reading device 43, e.g., a proximity reader or other device for electronically obtaining industrial vehicle operator login information.

The information linking device 38 may alternatively be integrated with (built into) a corresponding industrial vehicle 12. As an example, the information linking device 38 may be integrated into a work area, e.g., a console of an operator's compartment. Regardless of whether the information linking device 38 is attached to an existing industrial vehicle 12 or built into a corresponding industrial vehicle 12, the features of the information linking device 38, can be integrated directly with other existing vehicle features and functions as set out more fully herein.

Within a given site 10, or other suitable computing environment 26, each information linking device 38 is assigned or otherwise derives a unique identifier that is known or made known to the corresponding industrial vehicle application server 14. Thus, using the known identifiers, the industrial vehicle application server 14 may conduct targeted communications with specific industrial vehicle information linking devices 38, or broadcast information to groups or all of the industrial vehicle information linking devices 38 that are associated with that industrial vehicle application server 14.

According to an aspect of the information system of the present application, to initiate communication between the industrial vehicle application server 14 and an information linking device 38, an acknowledgment sequence is implemented. For example, the industrial vehicle application server 14 may listen for information linking device(s) 38 to identify themselves as being available for communication with the industrial vehicle application server 14. Alternatively, the industrial vehicle application server 14 can send out a request or ping a specific information linking device 38 on an industrial vehicle 12. If the pinged information linking device 38 responds to the industrial vehicle application server 14, an exchange of information between the information linking device 38 and the industrial vehicle application server 14 may occur.

Figure 3:
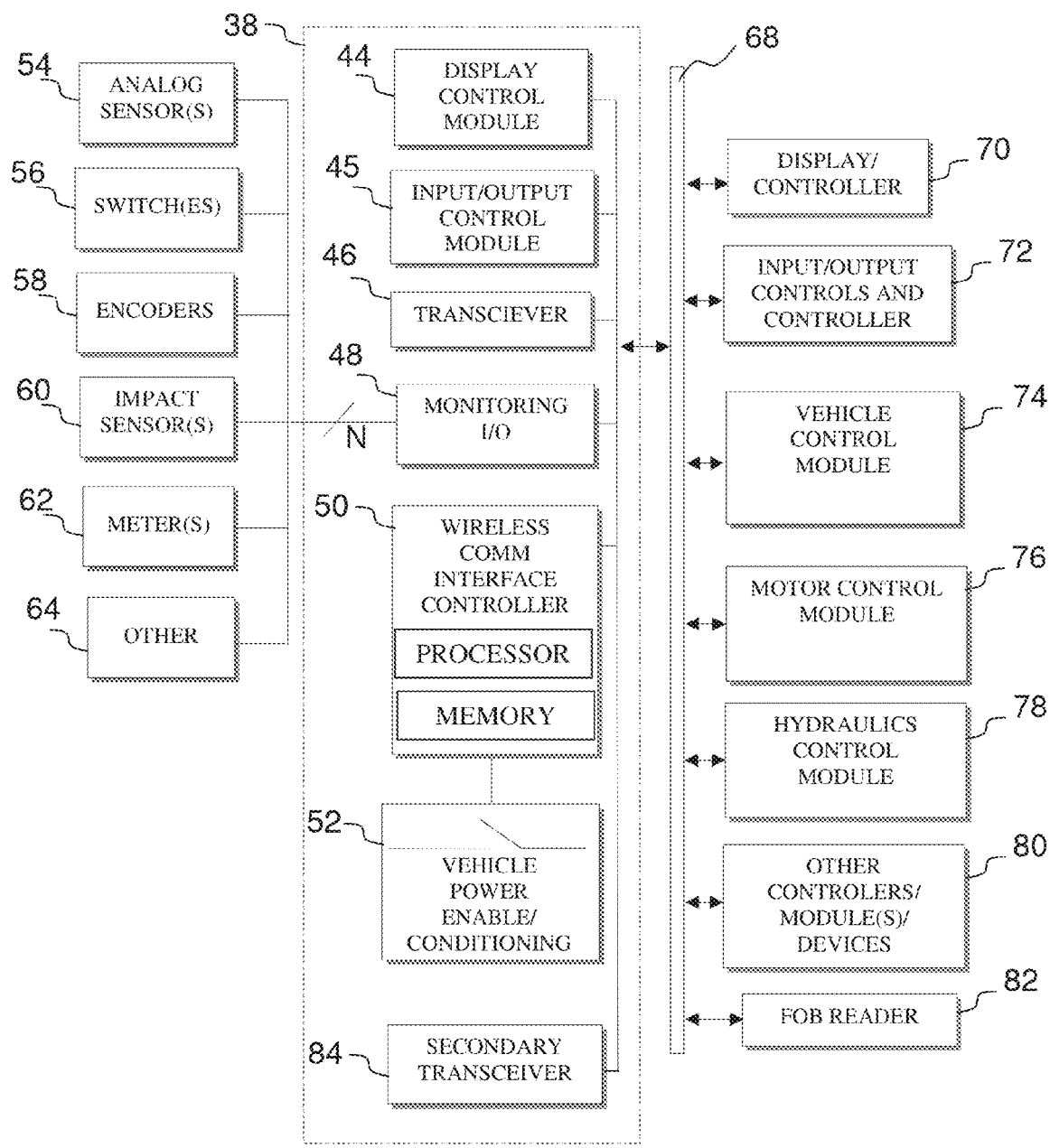
FIG. 3 is a block diagram of an information linking device and corresponding vehicle features according to various aspects of the present invention.

Referring to FIG. 3, a block diagram illustrates select features of an exemplary implementation of an information linking device 38 that has been integrated with a corresponding industrial vehicle 12. The illustrated information linking device 38 comprises a display control module 44 for controlling the display 41 and an input/output control module 45 that is associated with the controls 42. The information linking device 38 further comprises a transceiver 46, a monitoring input/output module 48, a wireless communications interface controller 50 and vehicle power enabling/conditioning circuitry 52.

The transceiver 46 may provide, for example, two-way wireless communication with processing devices, including server computers such as the industrial vehicle application server 14 across the corresponding computing environment. The monitoring input/output module 48 may be utilized to receive sensor and control inputs and/or to control outputs such as horns, buzzers, lights and other asset components and/or devices. As just a few exemplary illustrations, the monitoring input/output module 48 may interface with analog sensors 54, switches 56, encoders 58 and other similar input devices, impact sensor(s) 60, meter input(s) 62 and any other analog or digital input and/or output signals 64 to integrate such information into the wireless communications system. The monitoring input/output module 48 allows data logging capabilities which can be used, for example, to monitor travel usage meters, hydraulic usage meters, steering usage meters, operator usage meters, miscellaneous sensor inputs and other types of asset related data.

Information detected by the monitoring input/output module 48 may be temporarily stored, collected, maintained, manipulated and/or otherwise processed, e.g., by a processor and corresponding memory in the interface controller 50 or other suitable processor and memory, which may be provided as part of the vehicle electronics. Further, the collected information may be communicated to a corresponding industrial vehicle application server 14, for example, using the transceiver 46.

The interface controller 50 may comprise a suitable processor, memory, software, resident firmware, etc., to control the functions of the information linking device 38 as described more fully herein. Moreover, the processor of the interface controller 50 may be configured to communicate with the transceiver 46 for wireless communication across the wireless computing environment to a corresponding server computer, e.g., the industrial vehicle application server 14. The power enabling circuitry 52, where applicable, allows power to be provided to the information linking device 38, even when the corresponding industrial vehicle 12 is powered down. Moreover, the power enabling circuitry 52 can be tied to the vehicle ignition to prevent industrial vehicle startup unless certain conditions are met, or to force the industrial vehicle to shut down, as schematically represented by the switch shown within box 52. As an example, industrial vehicle startup conditions may be evaluated by the interface controller 50 of the information linking device 38 or other suitable processor before allowing the industrial vehicle 12 to be powered up and fully functional for operation.

In an illustrative implementation where an industrial vehicle 12 comprises for example, a forklift truck, the components of the information linking device 38 may be coupled to and/or communicate with other industrial vehicle system components via a suitable industrial vehicle network system 68, e.g., a vehicle network bus. The industrial vehicle network system 68 is any wired or wireless network, bus or other communications capability that allows electronic components of the industrial vehicle 12 to communicate with each other. As an example, the industrial vehicle network system 68 may comprise a controller area network (CAN) bus, ZigBee, Bluetooth, Local Interconnect Network (LIN), time-triggered data-bus protocol (TTP) or other suitable communication strategy. As will be described more fully herein, utilization of the industrial vehicle network system 68 enables integration of the components of the information linking device 38 into the native electronics including controllers of the industrial vehicle 12 and optionally, any electronics peripherals associated with the industrial vehicle 12 that integrate with and can communicate over the network system 68.

Thus, as an example, a processor provided on an industrial vehicle, e.g., as provided within the interface controller 50 or otherwise integrated into the industrial vehicle 12, may be configured to wirelessly communicate with the industrial vehicle application server 14 via the transceiver 46. Moreover, the information linking device 38 may interact with at least one component of the associated industrial vehicle 12, such as by communicating with at least one native control module 70, 72, 74, 76, 78, 80, 82 of the industrial vehicle 12 across the vehicle network system 68 (e.g., CAN bus). As such, as will be described more fully herein, the information linking device 38 may be utilized as a bridge to connect native vehicle processes and features to the industrial vehicle application server 14.

Integration is further achieved where the event codes and other communications across the vehicle network system 68 are well understood by the information linking device 38, thus enabling interaction between the industrial vehicle application server 14, the information linking device 38 and the industrial vehicle 12, e.g., at the machine component, subsystem, and system levels.

For example, the processor provided within the interface controller 50 or otherwise integrated into the industrial vehicle 12 may communicate configuration information from the industrial vehicle application server 14 to at least one component of the industrial vehicle 12 across the vehicle network system 68. The processor provided within the interface controller 50 or otherwise integrated into the industrial vehicle 12 may also and/or alternatively receive operational information from one or more components of the industrial vehicle 12 across the vehicle network system 68 that is conveyed to the industrial vehicle application server 14. The processor may also filter, manipulate or otherwise process information communicated across the vehicle network bus/vehicle network system 68.

As another example, the information linking device 38 may communicate with input/output controls and corresponding I/O controller 72, such as for controlling switches, buttons, levers, handles, pedals, etc., that are assigned to functions of the industrial vehicle. The information linking device 38 may also communicate with a vehicle control module (VCM) 74 that controls the electronic capabilities of the industrial vehicle, a motor control module 76 that controls the drive wheels of the vehicle, a hydraulics control module 78 that controls the hydraulics, e.g., the lift of the vehicle and any other controllers/modules and other electronics 80 that are associated with the industrial vehicle. Still further, the information linking device 38 may communicate with other miscellaneous devices such as a keyless entry fob reader/proximity reader 82 or any other devices that are attached to the industrial vehicle 12.

The controllers/modules and other electronics 80, 82 may also include scanning technologies such as bar code scanners, RFID and other tag reading technologies, hardware for supporting warehouse management systems and other enterprise software, printers and other output devices as well as other technologies that an industrial vehicle operator may currently utilize as separate components.

As an alternative to communication over the network system 68, components may be communicably coupled to the information linking device 38 via an input 64 coupled to the monitoring input/output module 48 or via other suitable input to the interface controller 50, such as where a given separate component, e.g., a tag reader, cannot communicate across the CAN bus or other suitable vehicle network system 68 of the industrial vehicle 12.

Regardless of whether various components communicate via the input/output control module 45, the monitoring I/O module 48 or over the network system 68, the various components of the industrial vehicle 12, e.g., the I/O controller 72, the VCM 74, motor control module 76, hydraulics control module 78 and other controllers 80 can be integrated into an enterprise infrastructure by utilizing the information linking device 38 to merge all information flowing into or out of the industrial vehicle 12 into a wirelessly communicated data stream(s) that interacts with other enterprise resources.

Still further, according to further aspects of the information system of the present application, an optional secondary or alternative communication device may be utilized. As a first illustrative example, an optional secondary transceiver 84 may be provided on the industrial vehicle 12. Although illustrated in FIG. 3 as part of the information linking device 38, the secondary transceiver 84 may alternatively be provided as a separate component that couples to either the vehicle network bus 68, e.g., CAN bus, or the secondary transceiver 84 may couple directly to the information linking device 38. By way of illustration, the secondary transceiver 84 may comprise a cellular device capable of communicating independently of the wireless infrastructure of the corresponding enterprise 10, 26.

Referring briefly back to FIG. 1, as an alternative to equipping each industrial vehicle 12 with its own secondary communication device, the enterprise 10, 26 may include a secondary communications device 86, such as a cellular router or gateway. In this regard, the industrial vehicles 12 may communicate wirelessly using the information linking device 38 as discussed above, e.g., using the normal wireless transceiver and wireless protocol, such as an 802.11b/g, etc. However, once a message has been received by the wired network, the secondary communications device 86 may selectively communicate the message via cellular network. This capability combines the features of an always-on communication technology such as cellular, with the connectionless capabilities of the Internet. The use of a secondary communications device will be discussed in greater detail herein.

Data Collection

Information detected by the monitoring input/output module 48 or otherwise obtained by accessing the network system 68 may be temporarily stored, collected, maintained, manipulated and/or otherwise processed, e.g., by a processor and corresponding memory in the interface controller 50 or other suitable processor and memory, which may be provided as part of the industrial vehicle electronics. Further, the collected information may be communicated to the industrial vehicle application server 14, for example, using the transceiver 46. Thus, the information linking device 38 may be used to facilitate the coupling of data logging from the industrial vehicle 12 to the industrial vehicle application server 14. As will be described in greater detail herein, this approach can be used to create a history of operational data that may vary over time, such as speed, temperature, battery state of charge, proprietary service codes, height, weight and other measurable parameters. In this regard, the information linking device 38 may collect raw network data, e.g., raw data from the vehicle network system 68 (e.g. CAN) and merely pass this data on to the industrial vehicle application server. Alternatively, the information linking device 38 can collect, aggregate, manipulate or otherwise transform collected data into logged data. The transformed log data can subsequently be communicated to the corresponding industrial vehicle application server 14.

Still further, the industrial vehicle application server 14 may further process the information collected from the information linking devices 38 to produce vehicle intelligence information and business intelligence data. Vehicle intelligence information may include for example, information generated by the vehicle application server 14 about the status, health, etc. of an individual industrial vehicle 12 or of a fleet of vehicles 12 based upon aggregations, transformations or other data manipulations of the collected vehicle information. Still further, business intelligence data generated by the vehicle application server 14 may include for example, fleet recommendations, fleet sizing suggestions, etc.

Moreover, data can flow from the industrial vehicle application server 14 to the processor 50 of the information linking device 38 via the transceiver 48. Still further, as will be described in greater detail herein, the processor 50 on the corresponding industrial vehicle 12 may be configured to implement special processing based upon parameters defined by the industrial vehicle application server 14, e.g., to collect specifically requested or otherwise non-standard types of data, to receive and implement commands, to received data from the industrial vehicle application server 14, to collect or to convey different types of data based upon different modes of operation selected by the industrial vehicle application server 14, to require the vehicle to implement certain defined functions, etc.

Hierarchical Organization of Data

As noted in greater detail herein, disruptions in the operation of industrial vehicles 12 impact the ability of the management system and corresponding wireless infrastructure to obtain peak operating efficiency. Moreover, health, status, suitability, etc., of the industrial vehicles 12 are conventionally difficult matters to manage. This technical problem of automating the prioritization of timely service to a fleet of monitored industrial vehicles may be solved by a technical solution that is characterized based upon usage metrics.

Figure 4:
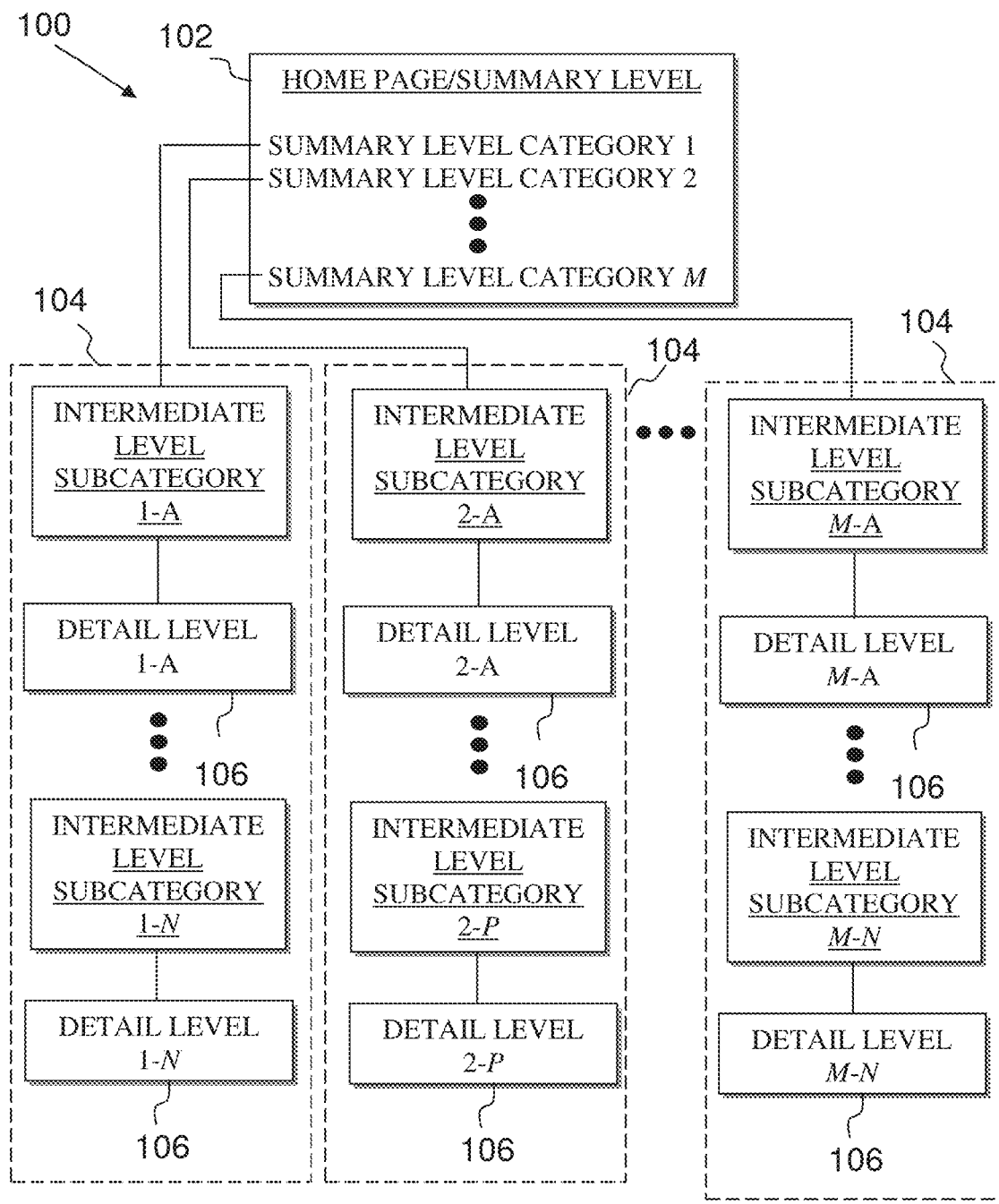
FIG. 4 is a flow chart illustrating an exemplary hierarchical organizational structure for organizing dashboard information according to various aspects of the present invention.

Referring to FIG. 4, a hierarchical approach may be utilized to assemble and organize actual recorded or otherwise derived industrial vehicle metrics that quickly and efficiently define features of interest to an enterprise manager with regard to the status of a fleet of industrial vehicles. As illustrated, a hierarchical organizational structure 100 includes a summary level 102, a plurality of intermediate levels 104 and a plurality of detail levels 106. Working up the hierarchy 100, the detail levels 106 each define one or more detail level metrics where each detail level metric characterizes at least one industrial vehicle feature and/or a vehicle operator feature.

A vehicle feature is any vehicle characteristic that is of interest that can be quantified, computed, measured, expressed, recorded, compared, etc. Although several exemplary vehicle features will be described in greater detail herein, a few exemplary vehicle features may include a count or measure of detected or otherwise sensor detected impacts, hours of operation, energy usage, battery condition, etc.

Similarly, a vehicle operator feature is a characteristic that is of interest that can be quantified, computed, measured, expressed, recorded, compared, etc., that relates to how an industrial vehicle operator uses, operates or otherwise interacts with a corresponding monitored industrial vehicle 12. Industrial vehicle operator features may also include aspects related to requirements to operate a corresponding vehicle, such as authorizations, certifications, compliance, etc. Although several exemplary vehicle operator features will be described in greater detail herein, a few exemplary vehicle operator features may include checklist compliance, certification/training status, etc., examples of which are also described in patent application Ser. No. 11/956,022 (US2008/0154712) entitled "FLEET MANAGEMENT SYSTEM", patent application Ser. No. 11/956,045 (2008/0154691) entitled "FLEET MANAGEMENT SYSTEM" and patent application Ser. No. 12/751,120, entitled "INFORMATION SYSTEM FOR INDUSTRIAL VEHICLES", which are each incorporated by reference in their entireties. Operator features may also be expressed as a function of the associated industrial vehicle 12, e.g., hours logged onto the corresponding industrial vehicle 12, etc.

To facilitate organization, the various detail level metrics are logically organized into groups and each group is associated with an intermediate level 104. For example, each intermediate level 104 may define one or more sub-categories of like, similar or otherwise related detail levels. Correspondingly, each intermediate level sub-category is organized into the summary level 102 and is associated with a corresponding category of the summary level.

Thus, in this exemplary hierarchy, there is a top level or summary level having a plurality of categories. Each category is associated with an intermediate level. Correspondingly, each intermediate level has one or more sub-categories. Each sub-category is associated with a detail level, and each detail level comprises one or more detail level metrics that characterize industrial vehicle and/or industrial vehicle operator data.

User Interface

Figure 5:
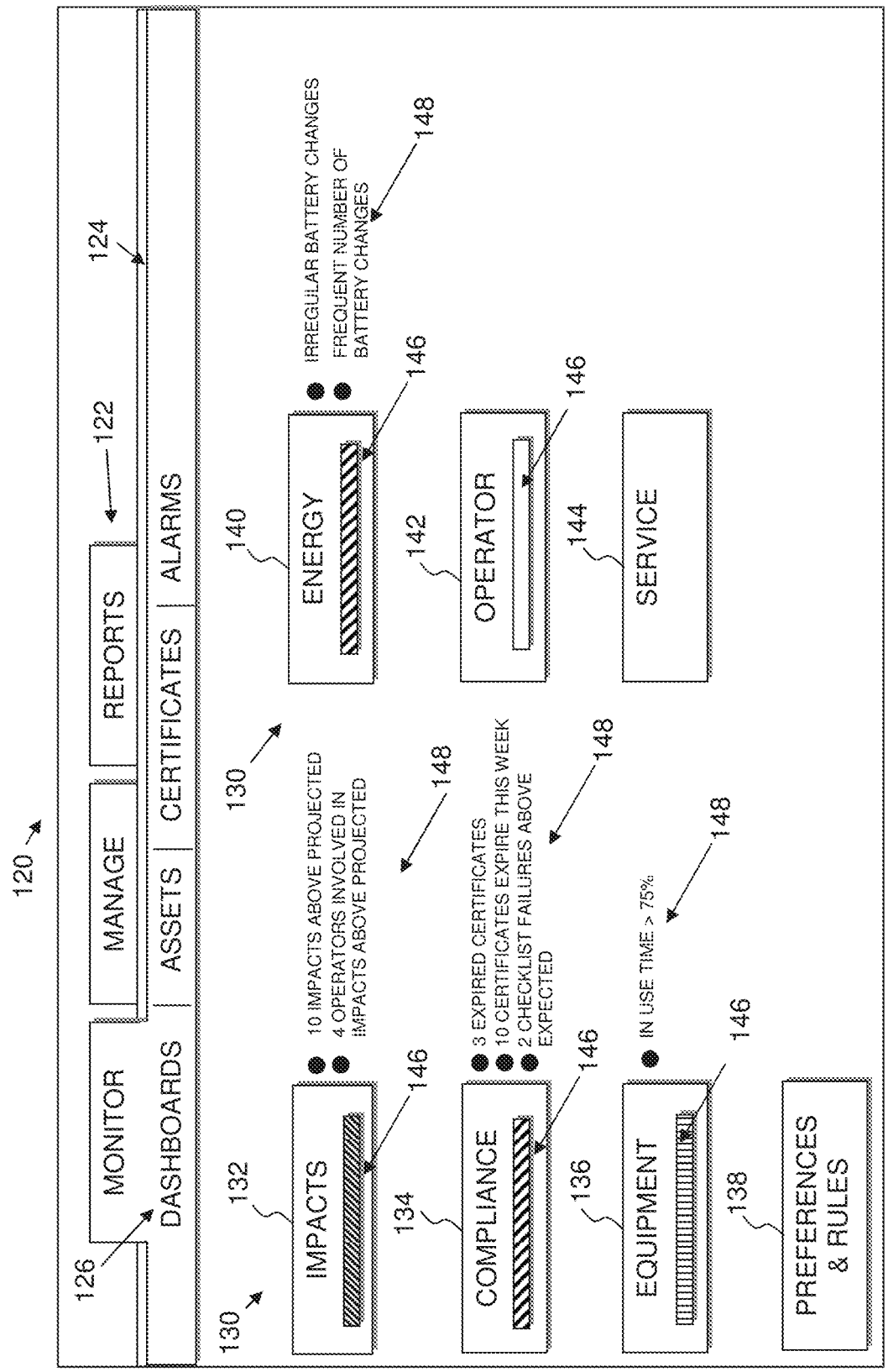
FIG. 5 is a schematic illustration of an exemplary dashboard home page/summary view according to various aspects of the present invention.

Referring to FIG. 5, a user interface 120 is illustrated, which may be utilized to display industrial vehicle information according to various aspects of the information system of the present application. In this regard, the hierarchical organizational structure 100 according to various aspects of the information system of the present application described with reference to FIG. 4 may be utilized to provide a generalized conceptual model for the corresponding implemented user interface.

The illustrated user interface 120 may be executed, for example, on a processing device 18 in data communication with the industrial vehicle application server 14. For example, user interface may be executed within a Web browser executing on a processing device 18 that connects to a corresponding Web server executing on or otherwise associated with the industrial vehicle application server 14. In this regard, a user may log into a home page or other Web page that displays features of the summary level of the hierarchical organizational structure 100 along with other information. Alternatively, other conventional file-server arrangements and software implementations may be utilized to link information collected by the vehicle application server 14 to the corresponding user interface. For example, the vehicle application server 14 may alternatively execute a portal such as a service, agent, a network based applications server, etc., for conveying information to the user interface.

In the exemplary user interface 120, a plurality of tabs 122 define pages of information available to the user. For example, as illustrated, three tabs are available, that generally organize information into Monitor, Manage and Report functions. In this example, the user has selected the Monitor function. Within the Monitor function, there are a plurality of sub-functions, including Dashboards, Assets, Certificates and Alarms. For example, the Dashboard menu option may be utilized to display real-time or near real-time management level dashboard style views of key aspects of the collected industrial vehicle information as will be described in greater detail below.

The Assets menu option may be utilized to monitor or analyze information related to the corresponding fleet of industrial vehicles. For example, selecting the Assets menu option may launch a view only display for obtaining quick asset information, such as information pertaining to who is operating various monitored industrial vehicles 12, information pertaining to the location of various monitored industrial vehicles 12, information pertaining to the time when various monitored industrial vehicles 12 last communicated with the industrial vehicle application server 14, how many hours remain until the next planned maintenance is due for various monitored industrial vehicles 12, etc.

The Certificates menu option may be utilized to monitor industrial vehicle operator certificates, training and requirements for operating the industrial vehicles within a corresponding fleet and/or to monitor or analyze information related to certificates and training For example, selecting the Certificates menu option may launch a view only display of certificates that are up for renewal, e.g., by month, etc.

The Alarms menu may be utilized to see alarms and/or to monitor information related to alarms of interest, some examples of which are described more fully herein, and take appropriate action. For example, selecting the Alarms menu may launch a view of alarms. Thus, a user can view all alarms that the site has generated, such as for inspection, certification expiration, impacts, due planned maintenance, emergency operations, etc. Further, depending upon the specific implementation, a user may be able to select specific alarms to acknowledge and/or add annotations or other comments.

Dashboard User Interface

A software "dashboard" is a tool that is used when managing a company's performance by presenting role-based, content sensitive visibility of important metrics in real time. Dashboard information can thus be utilized for monitoring and analyzing events and conditions in support of taking actions to improve and optimize corresponding operations. Dashboards typically present a "live" view of the current state of monitored events, e.g., by querying key performance indicators, i.e., detail metrics as set out in greater detail herein. It is noted that "live" views of the current state of monitored events may be based at least in part on historical data that has been previously stored and/or processed by the information system.

For purposes of discussion herein, FIG. 5 illustrates a user selecting the Dashboard menu option 126. By way of illustration, and not by way of limitation, the Dashboard menu option 126 displays a view that includes a plurality of dashboard fleet category options 130. As illustrated, the dashboard menu option 126 may display an initial home page or main page view that conceptually corresponds to the summary level 102 of the hierarchical organizational structure 100. In this regard, the summary level page includes a plurality of categories, implemented as fleet category options 130. The illustrative fleet category options 130 include by way of illustration, but not by way of limitation, an impacts category visually represented by an Impacts icon 132, a compliance category, visually represented by a Compliance icon 134, and an equipment category visually represented by an Equipment icon 136. Since the Equipment icon 136 is representative of the utilization of corresponding equipment, the icon 136 may also be identified as an Utilization icon. Also, the noted icons may be placed on selectively illuminated buttons or otherwise displayed.

The summary page also includes a preferences and rules link visually represented by a Preferences & Rules icon 138 which can also be placed on a selectively illuminated button. The preferences and rules link provides a set of user-customizable preferences and settings as will be described in greater detail herein. Since preferences may be equated to rules in some instances, a preferences link and corresponding Preferences icon may alternately be used.

As further illustrative examples, the summary page may include an energy category visually represented by an Energy icon 140, a measure of operator productivity category visually represented by an Operator icon 142 and/or a service category visually represented by a Service icon 144. Since the Operator icon 142 is representative of operator productivity, the icon 142 may alternately be referred to or labeled as a Productivity icon. The illustrated categories, category labels and visual indications are provided for example only. In practice, other categories, labels for the categories and/or visual arrangements of the information on the summary page may be implemented.

Each fleet management category option 130 may optionally include a status indicator 146. Similarly, each fleet management category option 130 may include optional annotations 148 that summarize relevant information with regard to the current state of the associated category. As noted in greater detail herein, a technical problem that is associated with utilizing a fleet of industrial vehicles is managing the status of each industrial vehicle. However, according to various aspects of the present invention, a technical solution is presented by aggregating, summarizing and optionally annotating detail metrics into a summary view. Moreover, as will be described in greater detail below, one aspect of this technical solution is to utilize "threaded indicators" as a convenient way to propagate pertinent information from hidden layers of detail view up to intermediate layers and from intermediate layers up to the main summary page to result in an instantly recognizable indication of fleet status directly on the summary page.

As illustrated, the status indicators 146 each provide a visual cue that summarizes the overall status of the associated category. The "summary" status indicators 146, along with optional annotation(s) 148 can provide an insight into the problem areas or efficient areas of operation of the fleet of industrial vehicles without the need for the user to navigate through multiple pages, links, views, windows or other screen displays to access corresponding detail views.

In an illustrative example, the status indicators 146, if present for a corresponding fleet management category option 130, may take on one of four states, including an alert condition, a caution condition, a normal operating condition and a disabled/not being monitored condition. The various states may be represented visually within the user interface, for example, by a colored light that appears as a visual indication directly on the category icon. For example, a red illuminating representation of the status indicator 146 may designate an alert condition, i.e., an area that requires attention. A yellow illuminating representation of the status indicator 146 may designate a caution condition, i.e., an area to watch, but that may not require immediate attention. A green illuminating representation of the status indicator 146 may indicate a normal operating condition indicating for example, that the associated detail metrics are all within their normal operating parameters. If the visual indication is not illuminated, it may be utilized to visually designate that the feature is not being utilized and/or monitored on that associated category or that the necessary parameters are not yet completely set up.

Although described herein with reference to red, yellow and green, other color choices and/or other visual metaphors may be utilized to characterize the various states of the status indicators 146 associated with corresponding fleet management categories 130. For example, geometric or emotive symbols may be used for operators having color recognition impairment, i.e., color blind operators, or these symbols may be used universally in place of colors. The colors, symbols, etc. can also be illuminated at different intensities, flashed, have their illumination intensities varied, not be illuminated at all if preferences have not been set, etc. Moreover, although described with reference to four states, any number of states may be utilized, including continuously variable states. Shades of color may also be utilized to further delineate importance of the condition. Also, as noted above, a category need not include one of the status indicators 146, such as where a visual summary is not possible or desired. Various approaches for determining the color each status indicator and the manner in which status indicators are "threaded" will be described in greater detail herein.

The annotations 148 may be derived from any number of sources. For example, the annotations 148 may be determined from detail level metrics of the dashboard that have been established to evaluate vehicle fleet information, or the annotations may be derived from different sources, including raw data or aggregations, manipulations of data that is available to the vehicle information application server 14, e.g., which may not be natively displayed within a dashboard view, etc. Moreover, the annotations 148 may be hot links to views that display detail level metrics and corresponding detail level views, as will be described in greater detail herein. In this regard, the annotations 148 may be setup, managed and/or evaluated based upon rules, which may include static rules, dynamic rules, policies, preferences, etc.

In this regard, the rules may be stored for example, as part of the data resource 16 associated with the vehicle application server 14. Still further, the annotations 148 may be selected based upon, or so as to correspond with, the particular state of the corresponding status indicator 146 or to highlight particular aspects that affected or otherwise controlled the determination of the corresponding status indicator 146. That is, the selected annotations 148 may correspond to a justification or "preview" as to why the corresponding status indicator 146 is displayed in its corresponding state.

By way of illustration and not by way of limitation, the Impacts category 132 may have a status indicator 146 that is visually presented in the user interface in red, indicating an alert condition. This may indicate to a user that the impacts category of fleet management may require immediate attention. In this regard, the user knows without navigating to buried, hidden or otherwise non-active or non-visible detail views, that there were 10 impacts above the expected amount, and that 4 operators more than expected were involved with detected impacts, in the exemplary illustration.

Similarly, the Compliance category 134 may have a status indicator 146 that is visually presented in the user interface in yellow, indicating a caution state. To understand the basis for the caution state, the annotations 148 inform the user that three operator certificates have expired, 10 operator certificates are about to expire and that there have been 2 industrial vehicle checklist operations that have failed above and beyond what was anticipated. This information may be utilized by the user to determine whether immediate corrective action is required, or if is okay to simply monitor the compliance category.

As another example, the annotations 148 need not report negative statistics. For example, as illustrated, the Equipment category 136 may include a status indicator 146 that is visually presented in the user interface in green, indicating normal operation. In this regard, the annotation indicates that the in-use equipment time has exceeded 75%, which may characterize a positive characteristic.

As such, immediately, a user knows what general areas of the fleet management need attention without even looking at a single detail screen, or even leaving the home page/summary screen.

In FIG. 5, the annotations 148 are merely exemplary. In practice, the particular annotations, where implemented, will likely vary depending upon the particular facts of the particular implementation. Moreover, the particular benchmarks, rules, preferences, etc., used to trigger the value of the status indicators 146 and corresponding annotations 148 may be context dependent and will vary depending upon the particular implementation, as will be described in greater detail herein. However, briefly for example, a facility with 100 industrial vehicle operators may choose to set the status indicator 146 of the Compliance category to yellow or even green if only three operator certificates have expired, whereas an operation with 10 industrial vehicle operators may want to set the status indicator 146 of the Compliance category to red if three operator certificates have expired. Numerous other combinations are possible and several further examples are set out in greater detail below.

Figure 6:
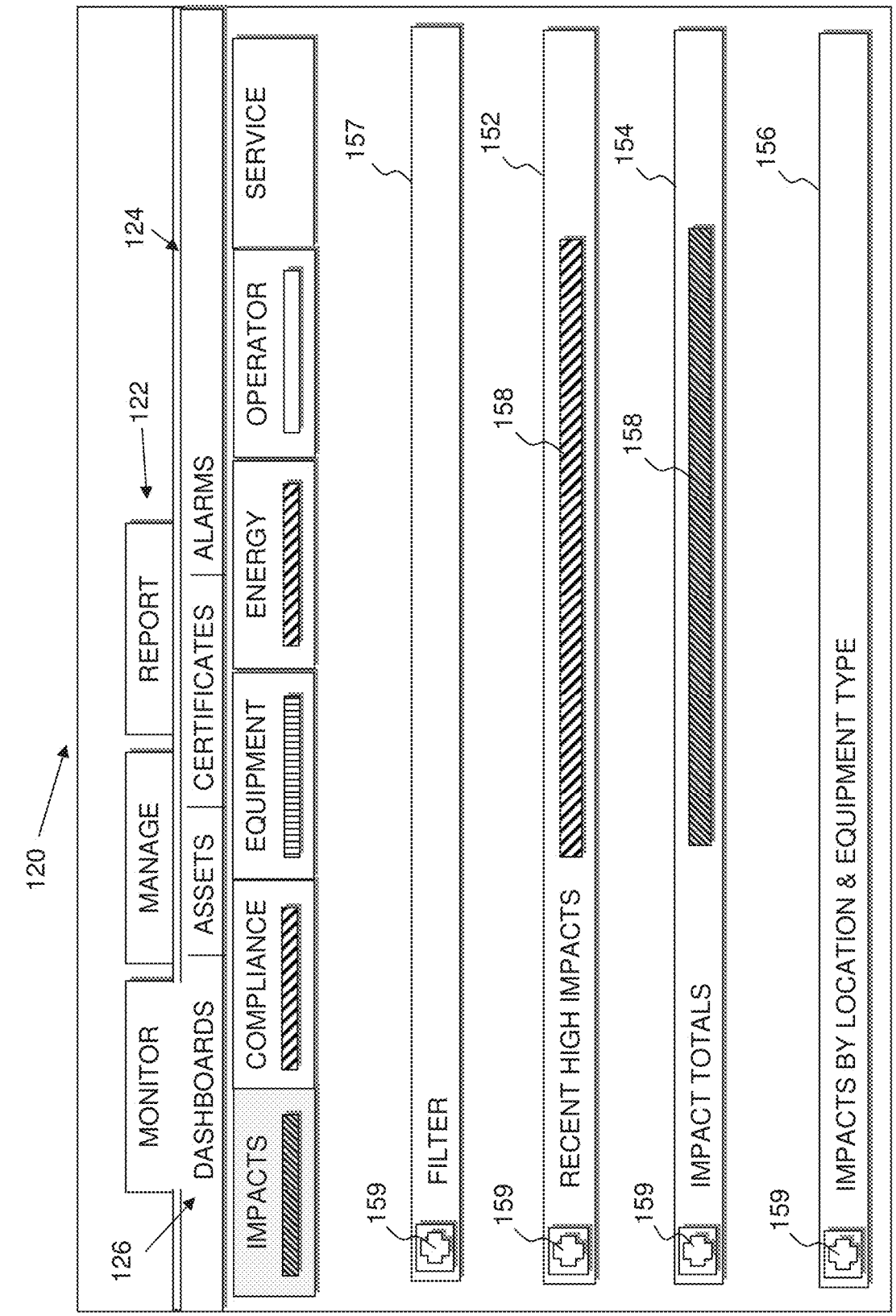
FIG. 6 is a schematic illustration of an intermediate view of an exemplary user selected category according to various aspects of the present invention.

Referring to FIG. 6, an exemplary view is illustrated within the user interface where the user has selected the Impacts category 132. As illustrated, the view has changed to move the categories 130 across the top of the page layout under the tabbed menu. The view illustrated in FIG. 6 may correspond, for example, to the intermediate level of the hierarchical organizational structure 100. In this regard, three exemplary sub-categories are now illustrated, including Recent High Impacts 152, Impact Totals 154 and Impacts by Location and Equipment Type 156. In this regard, the Impacts view is organized into at least one sub-category (three as illustrated), where each sub-category defines subject matter associated with the management of the fleet of industrial vehicles within the corresponding category of Impacts. The view also now includes an optional Filter bar 157 across the top of the sub-categories. The optional Filter bar 157 may be provided to allow for user adjustable or user configurable queries of the detail data, i.e., preferences, so that the Filter bar may also be referred to and/or labeled as a Preferences bar. The Filter/Preference bar will be described in greater detail below. The illustrated view is merely exemplary, and other visual organizations and presentations of the information may be implemented.

As further illustrated, each sub-category may include an intermediate status indicator. By way of illustration, and not by way of limitation, the Recent High Impacts 152 and Impact Totals 154 sub-categories of FIG. 6 each include an intermediate status indicator 158. The intermediate status indicators 158 are analogous to the summary status indicators 146 described with reference to FIG. 5. However, the intermediate status indicators 158 are deployed on an intermediate level. Thus, keeping with the example of FIG. 5, the Recent High Impacts intermediate status indicator 158 is visually represented in this example by the color yellow, indicating a caution condition/operating state as evidenced by the cross-hatch in the associated intermediate status indicator 158 that is the same as the cross-hatch for the summary status indicator 146 associated with the Compliance icon 132.

Analogously, the Impact Totals 154 status indicator is visually represented by the color red in this example, indicating an alert condition, as illustrated by corresponding cross-hatch in this illustrative example that is the same as the cross-hatch for the summary status indicator 146 associated with the Impacts icon 132. Moreover, the Impacts by Location And Equipment Type 156 sub-category does not include an intermediate status indicator 158, in this example. The lack of an intermediate status indicator 158 may indicate that a status is not desired, not practical in the context of the corresponding detail information, etc.

The states of the various intermediate status indicators may take the same logical arrangement as those utilized for the summary view, e.g., red for an alert condition, yellow for a caution condition and green for a normal condition. Moreover, as noted above, the status indicators are "threaded". For example, according to various aspects of the present invention, the intermediate status indicators are utilized to determine the state of the corresponding one of the summary status indicators 146 (which appears across the top of the menu in the intermediate view and in the summary level view). In this regard, any number of rules may be evaluated to set the value of the corresponding status indicator. By way of illustration, a rule may assert that the status of one of the summary status indicators 146 can be green (normal) only for so long as all of the corresponding intermediate status indicators 158 are also green, etc.

In the illustrative example, the Impact Totals one of the intermediate status indicators 158 is illuminated red, (e.g., designating an alert condition) but the Recent High Impacts one of the intermediate status indicators 158 is illuminated yellow (e.g., designating a caution condition). In this example, an exemplary rule may indicate that if at least one of the intermediate summary indicators 158 is red (alert condition), then the corresponding summary level indicator 146 must also be red (alert condition). Other rules may also/alternatively be utilized, and other schemes may be utilized to set the values of the indicators, e.g., based upon weighted, scaled, prioritized or any other measures.

The intermediate view can be used to navigate to a detail view corresponding to the associated sub-category. For example, as illustrated, each of the sub-category boxes has a control 159 that expands a window to make the detail level visible. Clicking within the control 159 again contracts or collapses the window so as to resume to intermediate level views of the data. However, any other form of navigational control, views and/or windowing may also/alternatively be provided to facilitate the visual display of detail level information.

The data values corresponding to associated detail metrics may be rendered for viewing in the user interface 120 through dashboard components such as gauges, charts, lists, graphs, tables and other visual metaphors. As such, the dashboard view according to various aspects of the invention herein, addresses the technical problem associated with efficiently maintaining a fleet of industrial vehicles, by enabling the monitoring and/or analyzing of industrial vehicle performance in support of actions that are directed to optimizing and/or improving the operations thereof.

In this regard, the detail metrics may be derived from any combination of data available from the operational environment 10, 26. Further, information may also be considered, which is derived from across the network, e.g., from the third party server 30 as will be described in greater detail herein. The particular data required from the operational environment to compute a current value for a given detail metric will thus depend upon the definition of that detail metric. Moreover, detail metrics may be dependent or otherwise relate to or cross-reference one another.

In this regard, the data resource 16 associated with the vehicle application server 14 may contain for example, a rules database, a detail metrics data store, etc., to facilitate ready visualization of the underlying industrial vehicle information. For example, the information from the detail metrics may be retrieved from the data source 16 by the vehicle application server 14 and may be communicated to the dashboard view of the user interface illustrated in FIGS. 5-8. The manner in which the information is communicated to the user interface may be dictated by the selected visual metaphor (color, geometric figure, emotive icon, illumination level, etc.) utilized to visualize the underlying data.

Figure 7:
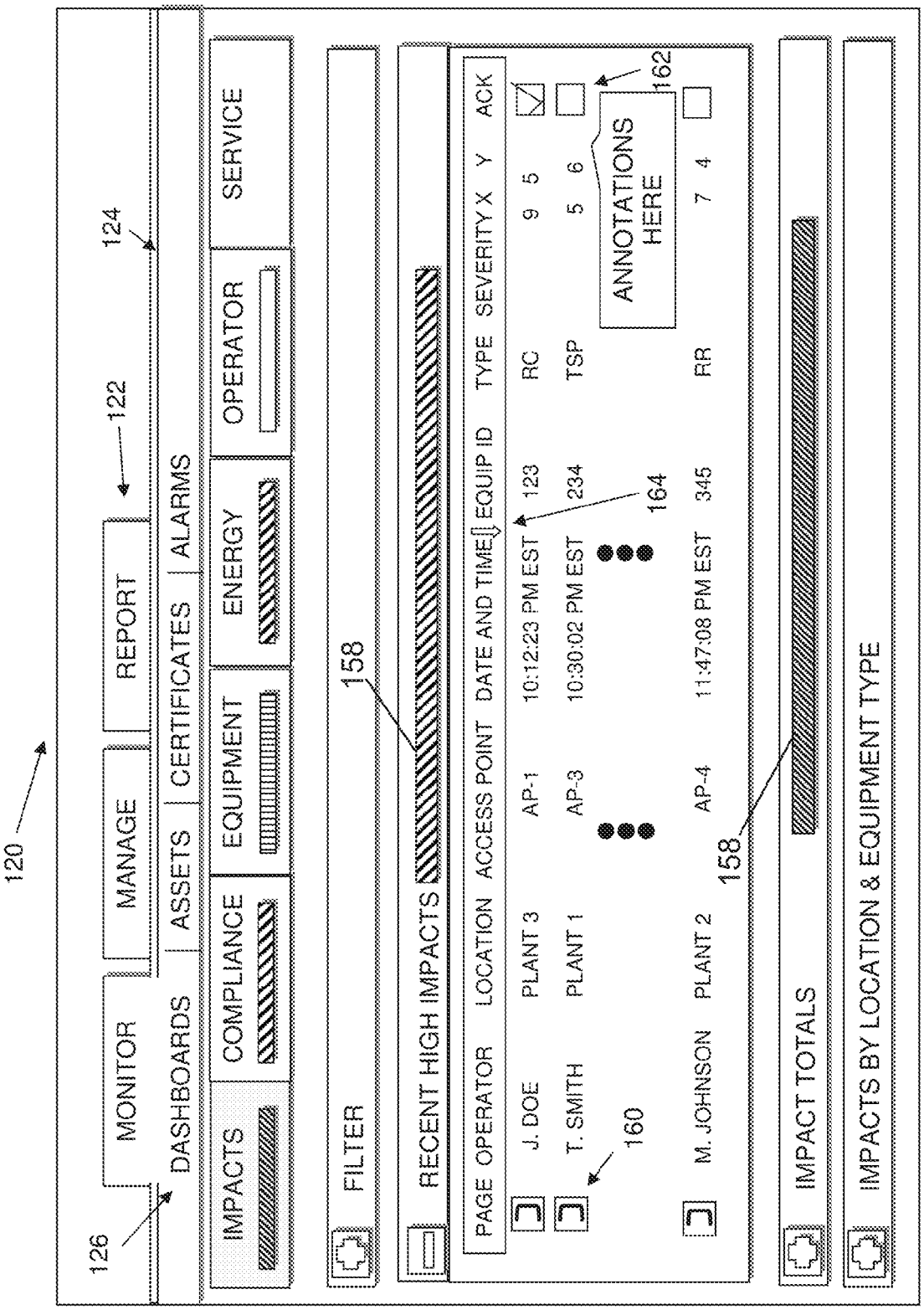
FIG. 7 is a schematic illustration of an exemplary detail view according to various aspects of the present invention.

Referring to FIG. 7, an exemplary detail dashboard view is illustrated according to various aspects of the information system of the present application. In this exemplary illustration, the user has selected the Impact List detail item. In response thereto, a detail view is opened up. As illustrated, the detailed view is implemented as an expanded window. However, the detail view could alternatively be opened in a separate window, on a new screen or in any other appropriate manner. In this exemplary view, the user is inspecting a detailed view of impact information. For this particular exemplary view, data is presented in a table form. However, the particular type of data to be viewed will likely dictate the visual metaphor utilized to define the dashboard view. Thus, tables, charts, line graphs, bar charts, pie charts, and other visual objects may be utilized to represent the metrics of interest.

In this example, the detail level metric of interest is determined to be a list of recent impacts that have been characterized as high. The information that is received by the industrial vehicle application server 14 from the information linking devices 38 on the industrial vehicles 12 may not be in a format that is directly insertable into the selected visualization of the desired detail metric. Rather, information manipulations such as transformations, conversions, computations, aggregations, extractions, comparisons or other manipulations may be required to obtain the desired information.

For example, the information linking device 38 on the Industrial vehicle 12, which is identified as Equipment ID 123, Type RC in the detail view, may transmit impact data by identifying the date and time and the severity of the impact by specifying X and Y direction accelerometer readings. The industrial vehicle application server 14 may extract from the data communication, knowledge of the equipment identifier and the industrial vehicle operator. Moreover, the industrial vehicle application server 14 may be able to ascertain the identification of the access point that received the communication from the industrial vehicle 12. For example, the industrial vehicle application server 14 may receive the access point media access control (MAC) address of the access point that communicated the associated information. As such, the industrial vehicle application server 14 can resolve the received MAC address to a user friendly name if such a mapping is set up within the system. Still further, the industrial vehicle application server 14 may utilize the impact data received from the industrial vehicle 12 and classify the nature of the impact, e.g., into high or low, for the purposes of building and/or sorting displayed detail views. In this regard, the information linking device 38 associated with a monitored industrial vehicle 12 that records an impact may also know or otherwise determine whether a detected impact should be classified as high, low, or some other classification, and to take action appropriate.

In this way, a record can be created that includes information necessary to characterize a list of impacts that was derived in part from information obtained directly from monitored industrial vehicles, and in part from data obtained or otherwise generated by the vehicle application server 14.

Because the data is presented in a dashboard view, the data is in real-time or near real time, i.e., a live view. As such, the details of the impact will be made available to the detail view a short time after the actual occurrence of the impact. The particular delay is subject to transmission line delays and software refresh/update rates. Because an impact may have operational consequences or consequences that would otherwise affect the industrial vehicle operator the detail view also includes a call or page button 160. The page button 160 may allow, for example, one or two way instant messaging to the operator of the industrial vehicle that triggered the impact. This may allow real-time assessment of an impact situation.

For example, assume that at time 10:12:23, operator J. Doe, operating Equipment ID 123, TYPE RC caused an impact listing to populate the detail view. The user monitoring the impact event can press the associated page button 160 and ask why the impact occurred. J. Doe may then respond to the user with an explanation. For example, it may be that the industrial vehicle 12 hit a bump driving into a semi-box trailer to retrieve a pallet for delivery to a receiving lane. In this regard, the user may optionally acknowledge the impact, such as by checking the Acknowledge (ACK) checkbox. The Acknowledge (ACK) checkbox may also optionally trigger a notepad for storing annotations by the user so as to completely document the impact event. For example, the operator may inform the server software via the page feature that the SC truck that usually handles the task of unloading semi trailers into the receiving lanes was at the battery charge station and the corresponding semi truck needed to pull out, so the RC was used to grab the last remaining pallet.

In this illustrative example, an intermediate status indicator 158 is provided. To obtain the intermediate status indicator 158 for the impact list sub-category, the associated detail metric is evaluated, e.g., based upon one or more previously determined rules, etc. For example, in the illustrative example, it may be determined that the intermediate status indicator 158 should have a value of green (normal) for so long as there are no impacts, or where every monitored impact has a type that has been classified as a low impact. The rules may also set the intermediate status indicator 158 to a value of yellow if any detected impact has been classified as a high impact so long as no acceleration data exceeds a value of 10, and the rules may set the intermediate status indicator to red (alert condition) if at least one high impact records accelerometer data that exceeds a value of 10. As further examples, the intermediate status indicator 158 may change states based upon a number of impacts, a value of the severity of each impact, etc. For example, the vehicle application server 14 may perform computations, comparisons, aggregations, averages or other manipulations of the data in the detail metric to determine the value of the intermediate status indicator 158.

Referring to FIG. 7, the view may also include controls for manipulating the presentation of the detail level metric data. For example, a control 164 may be provided to sort the data based upon the selected field. Thus, for example, a user can dynamically re-sort the displayed data based upon any one of the fields of data in the detail metric view. Although the Date and Time field is illustrated as having a sort control 164, any other field may optionally be selected for sorting the detail data.

Figure 8:
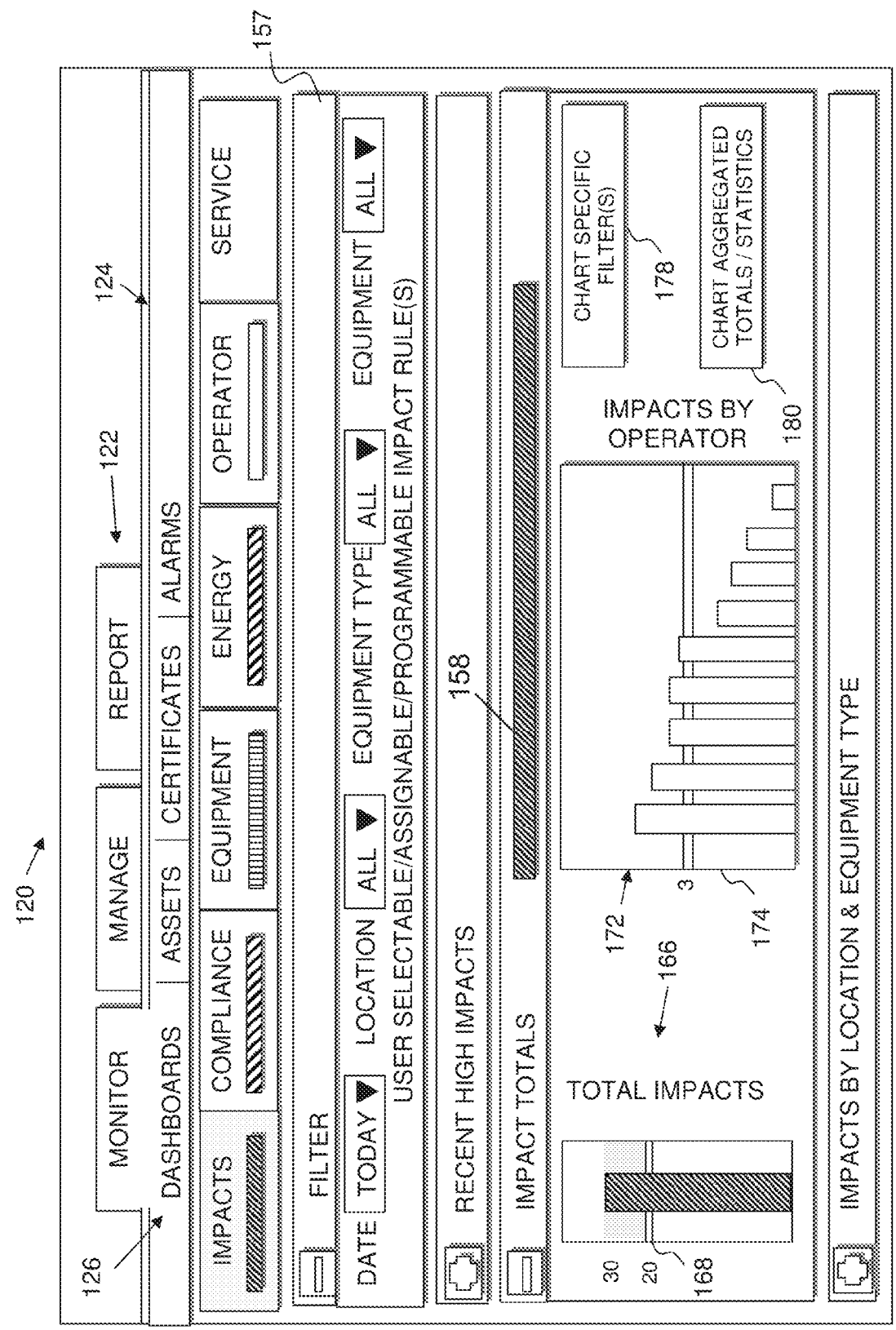
FIG. 8 is a schematic illustration of another exemplary detail view according to various aspects of the present invention.

Referring to FIG. 8, another illustrative example is shown. In this illustrative example, it is assumed that the user has selected the impact totals sub-category. In this regard, the impact list previously discussed with reference to FIG. 7 is collapsed back into a summary view and the impact total option is expanded. In practice, the detail view of the impact total may be illustrated in a separate window, on a separate screen, page, etc.

Also, for purposes of clarity of discussion herein, FIG. 8 illustrates one exemplary implementation of the Filter bar 157 (which may also be referred to as a Preferences bar) menu option. In this example, the Filter bar 157 is expanded to display a plurality of filter options (or preferences) for collecting the data that is viewed in the corresponding detail view. In the illustrative example, the user can select from drop down boxes to select the duration of impacts to be considered in the detail dashboard view. The user may also be able to select a location, e.g., where multiple locations can be individually monitored. The user may also use the Filter bar 157 to define the rules/preferences associated with the comparison of a benchmark to a corresponding detail metric. For example, the user may assign a rule associated with a level 1 or lower bound of a benchmark and the user may assign a rule associated with a level 2 or an upper bound of the benchmark.

In this way, a benchmark is defined by a benchmark range, which may be convenient to facilitate a comparison of the detail metric to the benchmark where three states are utilized.

Thus, once level 1 and level 2 rules/bounds are set, the dashboard may assign a normal state and a corresponding green status indicator if an associated detail metric is below the corresponding benchmark range, assign an intermediate state and a corresponding yellow status indicator if an associated detail metric is within the corresponding benchmark range and assign an alert state and corresponding red status indicator if an associated detail metric exceeds the corresponding benchmark range.

If the Filter bar 157 is utilized to allow a user to establish user selectable, programmable, assignable, etc. rules or preferences for establishing benchmarks, then the Filter bar 157 may dynamically change based upon the associated sub-category. For example, if the user is in the Impacts category, the Filter bar 157 will display rules/preferences related to setting impact related benchmarks as shown in FIG. 8. Correspondingly, if the user is in the compliance category, the Filter bar 157 will display compliance related rules for establishing/evaluating benchmarks, etc.

The user may also want to filter or provide preferences for other variables, such as the equipment for inclusion in the evaluation, etc. In practice, other filter/preference criteria may also and/or alternatively be provided. Still further, the selection of options within the filter dialog is not limited to drop down menu selections. Rather, it may be desirable to alternatively use check boxes, radial boxes or other techniques for selecting the filter requirements. In addition, rules or preferences can be set and applied to all dashboards or, alternately, rules or preferences can be set using the individual dashboards.

Referring to the illustrative detail view, as noted above, any number of visual metaphors may be utilized to present the detailed metric. As a few further illustrations, as seen to the lower left hand corner of the detail view of FIG. 8, a bar graph chart 166 is provided to illustrate an exemplary detail metric that counts a total number of impacts. As illustrated, a benchmark 168 has been set to an exemplary value of 20, designating that 20 detected impacts are the acceptable benchmark of impacts to occur within a given period of time. As impacts occur within the filter criteria or set preferences, the total number of impacts is counted and a bar graph is illustrated. In this example, 30 impacts have been counted. Accordingly, in this example, the benchmark has been exceeded by 10 impacts.

Keeping with the above examples, the corresponding intermediate status indicator 158 may be set to a value of normal, e.g., green, for so long as the counted impacts remain below the previously established benchmark 168. Similarly, the corresponding intermediate status indicator may be set to alert, e.g., red, if the number of impacts exceeds the previously determined benchmark 168. Still further, an optional caution status indicator, e.g., yellow, may be set if the actual count of impacts falls within certain limits of the benchmark 168. For example, the limits may be based upon a deviation from the benchmark 168, a percentage above or below the benchmark 168, etc. Also, the caution status indicator may only apply when approaching the benchmark 168 but may turn to red if the benchmark 168 is exceeded, etc. Still further, as noted above, a benchmark may be established as a range. In this exemplary implementation, a caution status, e.g., yellow, may occur where the detail metric falls within the range of the associated benchmark range. Again, any number of rules, policies etc. can be established to determine how the number of impacts metric affects the determination of the associated intermediate status indicator.

As yet another illustrative example, it may be desirable to count impacts caused by the individual vehicle operators. A chart 172 in FIG. 8 illustrates the number of impacts attributed to individual vehicle operators. In the chart 172, each bar may correspond to a vehicle operator. As such, in this example, a detail metric is not aggregated on industrial vehicle data per se, but rather is based upon information relating to industrial vehicle operators. However, the detail metric is derived from data obtained from the monitored industrial vehicles 12, e.g., from electronically transmitted information from the information linking device 38 attached to a corresponding industrial vehicle 12. For generation of the chart 172, the user has set a benchmark of 3 impacts per user, e.g., using the Preferences icon 138 to reach the preferences menu option. As is illustrated in the chart 172, five users have each exceeded their benchmark of three impacts. As noted more fully herein, the impacts per user metric may also and/or alternatively be used as a measure to determine the status of the corresponding intermediate status indicator 158. As with the other examples herein, any number of rules, policies, preferences, etc., may be utilized to establish the value of the corresponding intermediate status indicator 158. Moreover, the results from multiple detail metrics may be considered by a rule when establishing the value of an intermediate status indicator 158.

In summary, as illustrated in FIGS. 5-8, a benchmark value is compared against detail data in a detail level metric and the results are displayed in a detail view as a visual metaphor. The comparison of the actual metric value, as may be filtered by rules, preferences, etc., to the corresponding benchmark, determines a status of that detail metric. Keeping with the examples herein, if the value of the metric falls below the benchmark (or benchmark range), a normal operation condition is attained, which may be associated with a first color, e.g., green status. Thus, the measure in the visual metaphor may also be represented by the color green or some other color, geometric shape, emotive icon, illumination, etc. to visually convey that the metric is below the benchmark.

Similarly, if the value of the metric falls above the benchmark (or benchmark range), an alert operation condition is attained, which may be associated with a different color, e.g., red or some other color, geometric shape, emotive icon, illumination, etc. Thus, the measure in the visual metaphor may be represented by the color red or otherwise to visually convey that the metric is above the benchmark. Where appropriate, e.g., where the benchmark is defined as a range of values, a metric that falls within the range may be associated with yet a different color, e.g., yellow or some other color, geometric shape, emotive icon, illumination, etc., representing an intermediate or caution state.

Still further, the above-described comparison is utilized to drive the values of corresponding intermediate status indicators 158. The various intermediate status indicators 158 drive and/or otherwise influence the associated summary level status indicators 146. In this manner, the detail view is color or otherwise coded, and this coding "threads" to the associated status intermediate status indicator 158. The various intermediate status indicators 158 "thread" to the summary status indicators 146. Stated another way, the status of a given summary status indicator 146 is derived from or threads back to one or more associated intermediate status indicators 158, which are correspondingly derived from or threaded back to detail level analyses of selected metrics and corresponding assigned benchmarks, and the visual display of the detail level metric itself is color or otherwise coded according to the result of the comparison/association of the detail value to a corresponding benchmark value.

Still further, as illustrated in FIG. 8, any one or more of the detail views may optionally contain controls 178 for further filtering and/or other processing of the detail metrics. Still further, any number of additional detail metrics and corresponding visual metaphors may be utilized to establish the necessary information desired to effectively and efficiently monitor a fleet of industrial vehicles. Moreover, each detailed dashboard view may contain summary information 180, such as boxes or windows that display totals, aggregates, statistical averages, etc.

Figure 9:
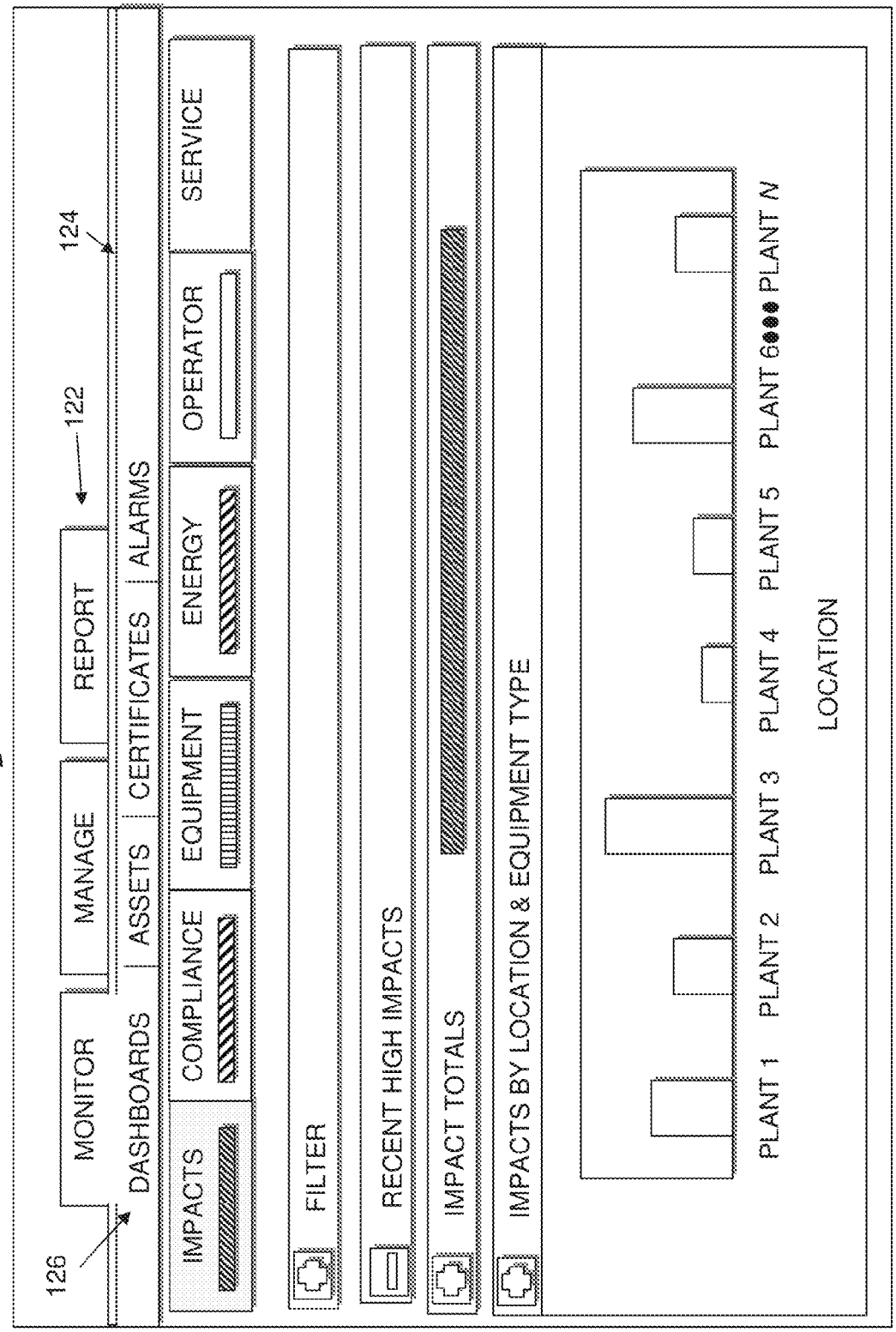
FIG. 9 is a schematic illustration of yet another exemplary detail view according to various aspects of the present invention.

FIG. 9 illustrates yet another exemplary detail view of Impacts by Location and Equipment Type wherein impacts by plant location are illustrated. It should be noted that in practice, each category and corresponding sub-category may be associated with any type of detail level metric, and those illustrated herein are by way of example of the many possible implementations suggested by the disclosure of the present application.

Figure 10:
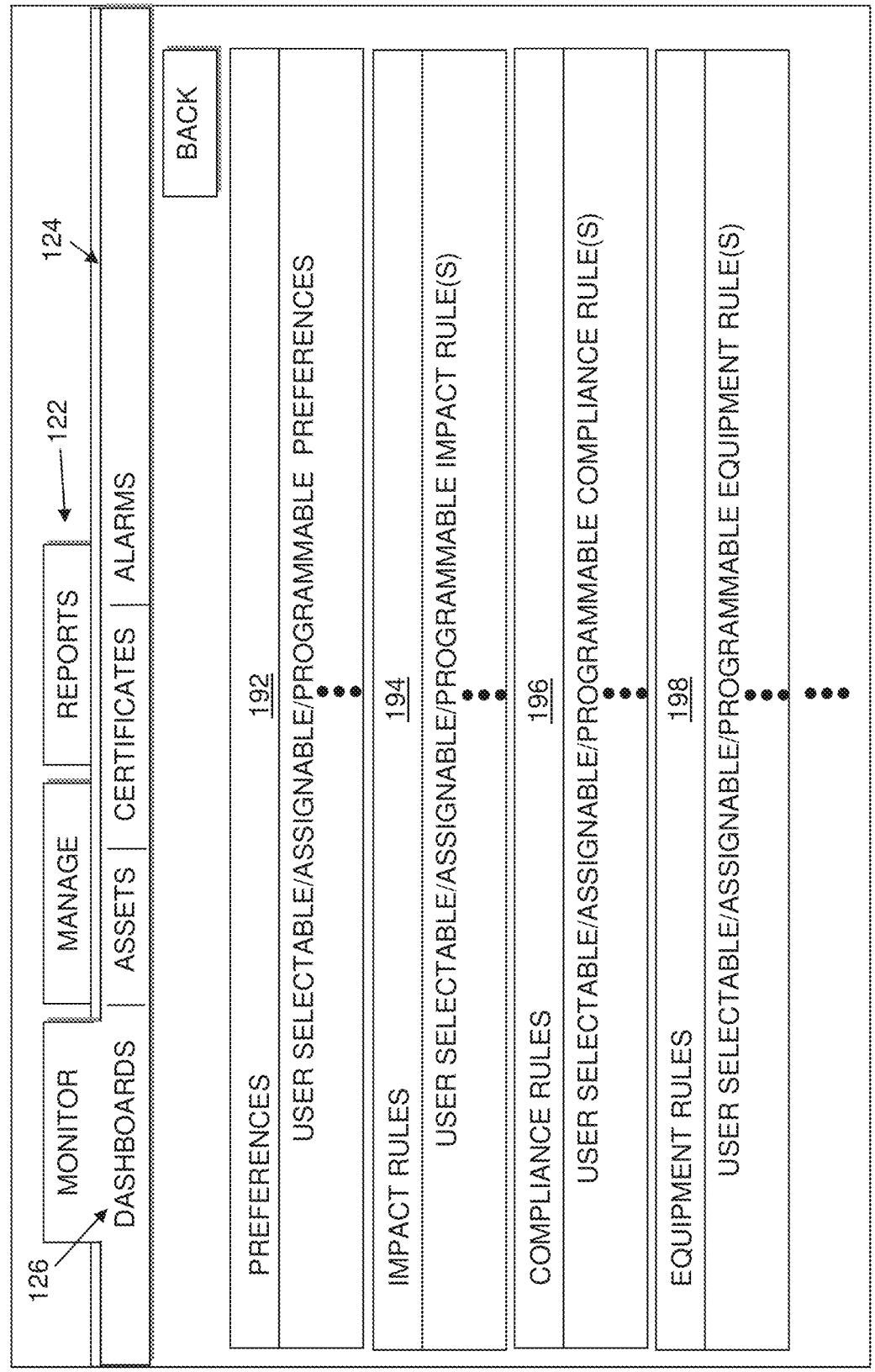
FIG. 10 is a schematic illustration of a Preferences and Rules view according to various aspects of the present invention.

Referring back to FIG. 5, as noted in greater detail above, an optional preferences and rules link represented by a Preferences & Rules icon 138 may be provided. Referring to FIG. 10, an exemplary intermediate view illustrates a few sub-categories of rules and preferences that may be utilized to set up the various dashboards described more fully herein. For example, as illustrated, rules/parameters may be customized for preferences 192, impact rules 194 (or impact preferences), compliance rules 196 and equipment rules 198. Rules/preferences may be provided for other and/or alternative categories provided on the summary dashboard page as well.

The various preferences and rules may be utilized to set up how the various dashboards compute and/or compare the associated metrics. For example, the interface can allow the user to dynamically build as many rules as desired to be applied to the detail level metrics associated with the associated category/benchmarks. By way of illustration, the user may select from drop down menu boxes to define new rules that can be added to a list of rules.

According to aspects of the present invention, the customized values of the preferences 192, 194 and/or rules 196, 198, etc., for example as shown in FIG. 10, are utilized to drive the evaluation of the state of the corresponding status indicators 146, 158 shown in FIGS. 5-8. That is, the values of the preferences 192, 194 are used to set the basis for calculating the detail metrics in order to determine the color/status of each category and corresponding sub-categories as illustrated.

Battery Management

The dashboard as described herein is capable of monitoring the batteries of industrial vehicles 12 so that a user of the dashboard interface can determine how the batteries are being used and how individual vehicle operators are performing. For example, the number of battery changes can be monitored to see how many battery changes occurred and an overview of the percentage of normal battery changes as compared to irregular battery changes can be provided. Irregular battery changes include, for example, early battery changes and short charge cycles. Such short cycling may include not properly depleting battery charge before recharging, not maintaining proper battery temperature, not fully charging a battery that is being charged, and the like. Battery change data can be presented in the form of cost of battery changes with a cost per change entered by the dashboard interface user.

The number of early battery changes can be viewed and an operator can be alerted when too many early battery changes have been made. In this way it is possible to change operator behavior through monitoring of undesired actions. The number of batteries that were not fully charged when put into the equipment can also be monitored and displayed, again with the possibility of alerting an operator when the operator has too many short charge cycles to modify operator behavior.

While not related to battery maintenance per se, the time it takes to perform battery changes can be monitored, accumulated, processed, etc. For example, displays of total time for all battery changes, average time to change batteries and comparisons of individual operator's battery change performance to the average time can be used for goal setting. The times for alerts and warnings for average battery change time can be set per operator. A battery disconnect detail report can be provided by drilling down to a single operator to understand how frequently they are changing batteries and how long it takes them to make a change. This detail can also show if the operator is performing irregular battery changes and understand when they occurred. The details about the battery disconnect events for a specific operator, including state of charge (SOC) of the battery and date and time of the event, can also be displayed. Thus, monitoring operator actions can be used to promote operator behavior change.

As another example, by monitoring the battery information in the dashboard view, a detail metric may be utilized to report battery charge state. Thus, by way of illustration, if a battery is being returned to service with a 60% charge, then the user of the dashboard knows that the industrial vehicle operator may not be following proper charging processes or the battery condition has deteriorated. On the other hand, if an industrial vehicle operator runs a battery to around 30% charge before recharging, the battery charge is being properly depleted and the user of the dashboard knows that the industrial vehicle operator is applying good battery management which will lead to better battery performance and extended battery life. Similarly, if an industrial vehicle operator starts a shift on an industrial vehicle that is operating with a weak battery charge, then the user of the dashboard knows that the previous industrial vehicle operator did not recharge the battery. In this way, battery maintenance can be easily monitored.

Figure 11:
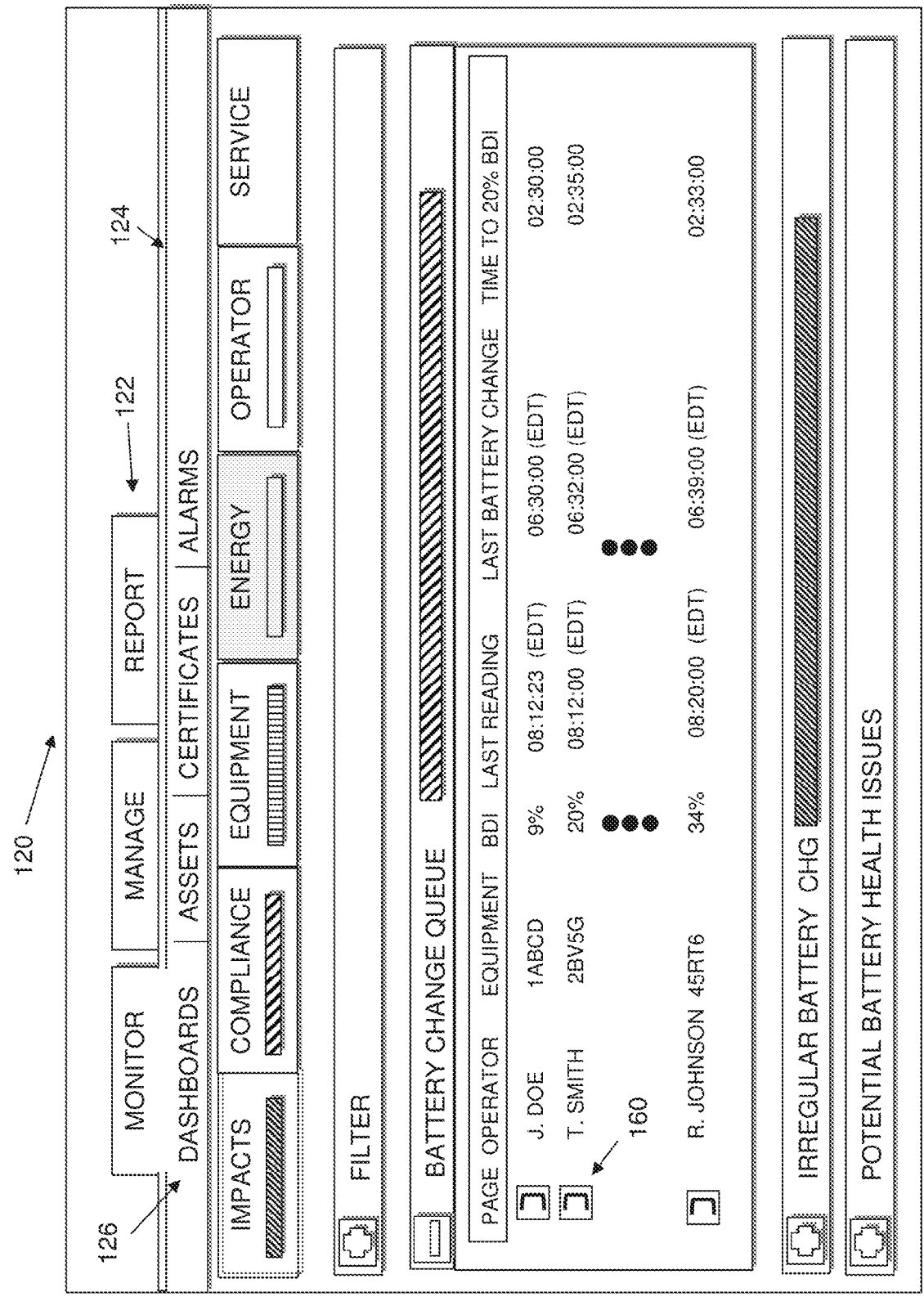
FIG. 11 is a schematic illustration of a Battery management detail view according to various aspects of the present invention.

Moreover, the dashboard detail metrics can be utilized to trigger work flows. For example, once a detected battery charge falls below a predetermined benchmark, e.g., 40%, the vehicle application server can evaluate the schedule of the battery charging station and schedule a time to bring the vehicle back into the battery charging station for a recharge in a manner that minimizes workflow disruption, as illustrated in FIG. 11, which shows a queue for controlling battery recharges. For example, the dashboard can show a list that prioritizes the need to bring industrial vehicles in for a battery charge/battery change. As with other features described herein, such a queue may optionally include a page or call or page button 160, the same as the call or page button 160 described with reference to FIG. 7, so as to one-way or two-way page the industrial vehicle operator, e.g., to inform the industrial vehicle operator of the time that is it necessary to bring the industrial vehicle 12 back for a battery charge.

According to further aspects of the information system of the present application, the detail metric can be expressed in any desired unit of measure, including cost. For example, a dashboard view of battery management may be utilized to measure watt hours of usage and translate this measure into a visual metaphor that characterizes energy consumption as a function of cost in dollars.

The dashboard view may further characterize the energy consumption based at least in part, upon a consideration of other measures, such as fork movement information, speed information, load weight information, etc., to determine whether the energy consumed correlates well to productive work, or whether energy is being wasted, e.g., by driving around too much without moving loads, etc. Still further, the dashboard may also query external sources, such as a warehouse management system (WMS) or other software utilized by an enterprise to ascertain the amount of actual work an industrial vehicle is actually performing.

For example, keeping with the above examples, the concept of a status indicator may provide a green display for industrial vehicles that are working efficiently from the perspective of energy consumption, a yellow indicator for trucks that are performing marginally, and a red indicator for industrial vehicles that are consuming energy but are performing little work. For example, the industrial vehicle may be simply driving around a lot without carrying a load, etc.

Dashboard General Observations

Several examples are given herein where the trigger of the indicator status is exceeding a predetermined benchmark value. As used herein and in the context of benchmarks, the term "exceeds" is not equivalent to "greater than" per se. Rather, exceeds is used for sake of discussion to mean transitioning across the benchmark in a manner that triggers a change in the state of the associated status indicator from a generally acceptable state, e.g., a green light or normal condition, to a less desirable state, e.g., a red light or alert condition. By way of illustration, in the above-illustrative example of impacts, a number of impacts that is greater than the benchmark "exceeds" the benchmark thus triggering the state (or state change) of the corresponding status indicator.

However, consider the situation of monitoring equipment usage where more usage is desirable as equipment that is not used or working may be underutilized. As such, a number of hours of equipment usage that is less than the benchmark "exceeds" the benchmark thus triggering a change in the state of the corresponding status indicator.

Still further, a benchmark need not be defined by a fixed, singular value. Rather, a benchmark may be expressed in terms of a range of values, one or more rules, one or more rules in addition to one or more values of data expressed in a corresponding detail metric, etc. Each rule may have one or more predicates that characterize the corresponding rule. Thus, a rule may be satisfied if all predicates are satisfied, or if at least one predicate is satisfied.

Still further, although a dashboard is intended for real-time or near real-time view of the "live" data, it is possible that certain detail metrics may comprise or otherwise utilize calculations based upon trends, aggregations of historical information, etc. For example, detail metrics of interest may include parameters such as the average number of hours the typical industrial vehicle operator is actually logged onto a corresponding industrial vehicle 12. This permits, for example, comparisons of average time a particular industrial vehicle, a type of industrial vehicle or a fleet of industrial vehicles is in use, sitting with the idle on, sitting with the idle off, being serviced, staged at the battery charging station, etc. Thus, by viewing one or more dashboard views that break down industrial vehicle use, utilization can be trended.

As noted in greater detail herein, computations may be implemented on the live data, and historical information may be extracted and evaluated to derive the detail metric expressed in the various detail level dashboard views. In this regard, new computations, generated as part of the dashboard, may themselves be preserved for historical reference.

As an additional note, although the real-time paging and/or text messaging was described herein with reference to an impacts-related dashboard, such a feature may be implemented in any dashboard application where real-time or close to real-time interaction with an equipment operator is desired. For example, a page option may be provided on dashboard views related to battery charge, checklist/compliance reporting, etc.

According to further aspects of the information system of the present application, the detail benchmarks may be derived from any number of sources, including sources external to the user interacting with the dashboard. For example, a dashboard detail metric may be compared against a benchmark value that is automatically determined, e.g., from an analysis of past performance data. Still further, the benchmark values may be derived or otherwise obtained from other sources. For example, a benchmark value may be obtained from a manufacturer server, such as server 30 described with reference to FIG. 1. As such, benchmark comparative mechanisms may be obtained and utilized to compare the performance of an industrial vehicle, operator, fleet of industrial vehicles, etc., against itself, e.g., over time, or comparisons may be performed to see how a given industrial vehicle operator, industrial vehicle, fleet, etc., perform compared to external measures.

Figure 12:
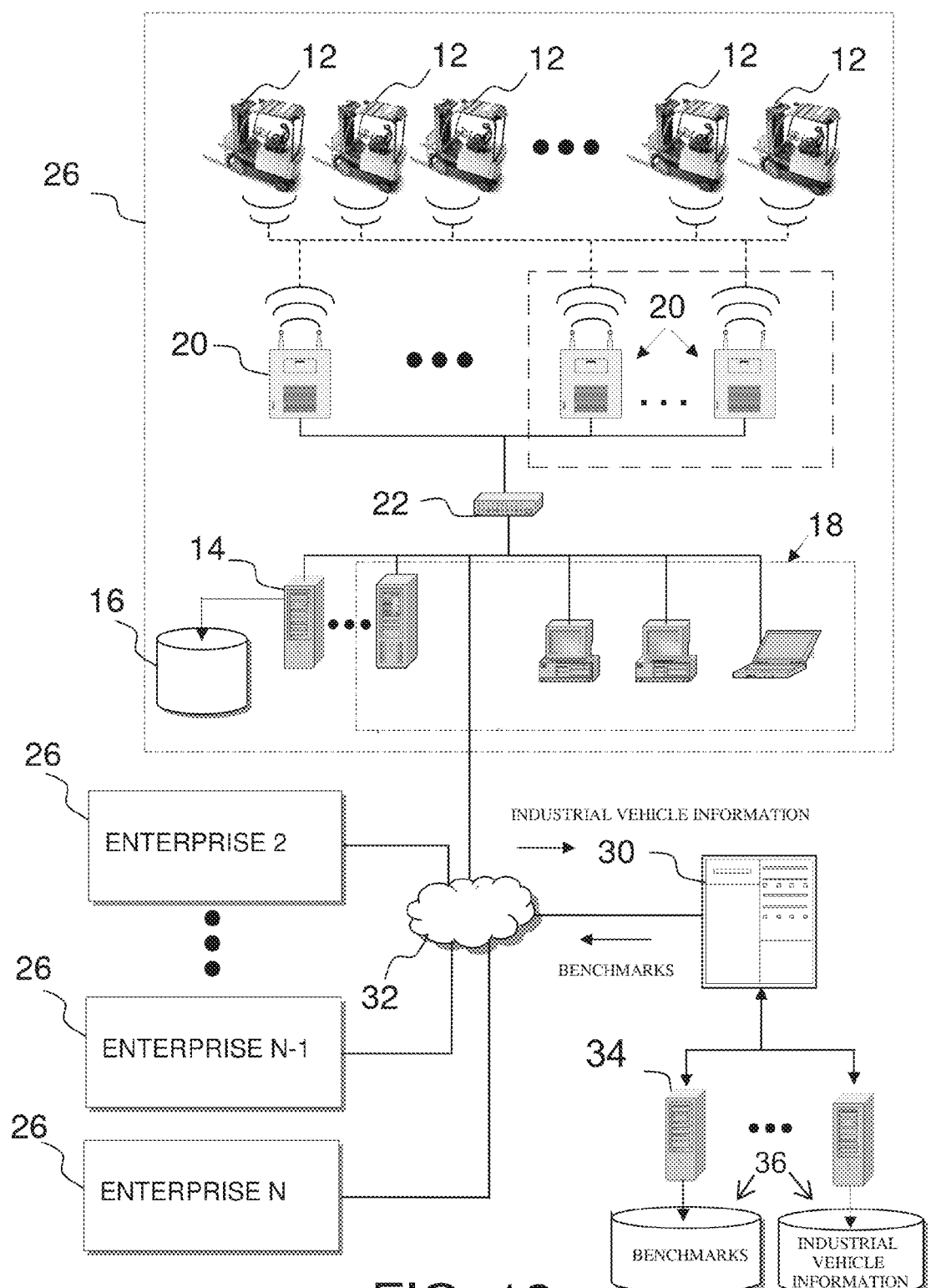
FIG. 12 is a schematic illustration of an environment for sharing industrial vehicle information with a remote server for generating benchmarks according to various aspects of the present invention.

By way of illustration, and not by way of limitation, with reference to FIG. 12, a remote server 30, e.g., a manufacturer server, may be utilized to collect industrial data from a plurality of enterprises 26. This may be accomplished using push or pull mechanisms. For example, the manufacturer server 30 may periodically query select vehicle information servers 14 associated with one or more enterprises 26. The manufacturer server 30 may also receive data pushed from the vehicle application server 14 associated with one or more enterprises 26. The manufacturer server 30 may store the collected data in one or more data sources 36.

In order to provide confidentiality and levels of security, the manufacturer server 30 may utilize the collected data to generate aggregations and, based upon the generated aggregations, derive one or more appropriate benchmarks. For example, the manufacturer server 30 can aggregate similar activities at different locations, e.g., different enterprise locations 26. From the aggregated data, the manufacturer server 30 may generate benchmarks based upon any desired statistical processing techniques, such as minimum, maximum, average, mean, median, variance, standard deviation, etc.

In an illustrative example, a user, associated with an enterprise 26 and having the appropriate permissions, may query the manufacturer server 30 to obtain benchmark information for one or more dashboard detail metrics. In this regard, the user may further be able to provide parameters that further define the scope of the desired query. For instance, a user may request a benchmark for a particular detail metric based upon a selected vehicle type, a specific application or task, a local, regional or national view or based upon other desired measures. Still further, multiple selection criteria may be utilized. For example, a user may be interested in obtaining a benchmark for a particular truck type performing a particular activity in a limited geographic region. As yet another example, a user may be interested in obtaining a benchmark that is limited to only enterprise users with a similar fleet size, facility size, etc.

Thus, a system is provided where monitored industrial vehicles populate local databases with industrial vehicle information. That information can then be utilized to populate a single source, e.g., the industrial vehicle manufacturer server 30 that collects and aggregates the industrial vehicle information from across multiple enterprises. That aggregated information can then be used to derive benchmarks that are fed back to the enterprises and local systems to monitor local fleets. This may result in changes to fleet performance, which folds back to the local vehicle application server 14, which in turn feeds back to the manufacturer server 30. Due to the feedback and fold-back mechanisms, dynamic adjustments of benchmarks can be realized in a manner that tracks or otherwise converges towards practical performance measures.

In this regard, each dashboard is capable of not only measuring performance via the recorded detail metrics, but also comparing the actual recorded detail metrics against fully customizable historical performance or expected performance indicators, e.g., which may be derived local to the corresponding enterprise 26 or based upon externally generated benchmarks, e.g., generated from the manufacturer server 30. Moreover, the benchmarks may be derived from internal, local, regional, national, international, etc., data.

According to further aspects of the information system of the present application, the manufacturer server 30 may be utilized to provide reconciliation features to fleet management. For example, the manufacturer expertise may be utilized with the collected industrial vehicle data to resolve the balance between actual data collected by a vehicle information server 30 at a local site compared to the industry.

Still further, the manufacturer server may be able to provide customized benchmark values by industrial vehicle type, application type, etc., across one or more computer enterprises. As such, an equipment manager can ascertain whether their performance is reasonable in view of aggregated information that may include information derived outside of their enterprise.

Also, the detail views may be presented as customizable visualizations that associate at least one detail metric with visual indicia. The visualization may comprise graphs, charts, lists, tables, alerts, and other visual aids to analyze and interpret the displayed detail metrics. As the values of the corresponding detail metrics change over time, the view in the dashboard user interface is updated to reflect the appropriate changes.

Having thus described the invention of the present application in detail and by reference to preferred embodiments thereof, it will be apparent that modifications and variations are possible without departing from the scope of the invention defined in the appended claims.

What is claimed is:

1. A method for monitoring usage metrics of industrial vehicles, the method comprising:
   receiving wirelessly communicated information from a plurality of industrial vehicles;
   storing the received information in a storage accessible by a server computer;
   utilizing an organizational structure to organize the received information, comprising:
      a summary level having a summary level category that defines a subject matter related to the management of industrial vehicles;
      an intermediate level having at least two intermediate level categories, each intermediate level category organized as a sub-category that further defines subject matter corresponding with the summary level category; and
      a detail level having at least one detail level metric corresponding with each intermediate level category, where each detail level metric defines subject matter associated with the corresponding sub-category;
   storing a benchmark value assigned for a particular detail level metric;
   associating a summary status indicator with the summary level category;
   associating an intermediate status indicator with each intermediate level category;
   analyzing, by the server computer, data comprising the received information from the plurality of industrial vehicles against each detail level metric to derive evaluation results, the analysis further comprising comparing the evaluation result of the particular detail level metric against the assigned benchmark;
   assigning an intermediate level value to each intermediate status indicator according to the analysis of each associated detail level metric;
   assigning a summary level value to the summary status indicator according to an evaluation of each corresponding intermediate level status; and
   communicating dashboard information from the server computer to a user interface executing on a client computer such that a user can navigate through the summary level category, the intermediate level categories and the detail level metrics and prioritize fleet management based upon the summary and intermediate status indicator values and the evaluation results.

2. The method of claim 1, further comprising:
   implementing the server computer as a third party server performing a hosted solution that monitors usage metrics of industrial vehicles for a plurality of independent enterprises.

3. The method of claim 2, further comprising:
   determining the benchmark based upon an aggregation of data collected from a single enterprise.

4. The method of claim 2, further comprising:
   determining the benchmark based upon an aggregation of data extracted across a plurality of enterprises.

5. The method of claim 1, further comprising:
   submitting a query to a third party server to determine the benchmark based upon at least one selection criteria; and
   receiving a response to the query with the determined benchmark value.

6. The method of claim 5, wherein:
   receiving a response to the query comprises receiving a determined benchmark that was determined based upon an aggregation of data extracted across a plurality of enterprises.

7. The method of claim 1, wherein:
   storing a benchmark value comprises deriving the benchmark value based upon a trend over time in the information received from the plurality of industrial vehicles.

8. The method of claim 1, wherein:
   storing a benchmark value comprises deriving the benchmark value for a specific vehicle operator such that the vehicle operator is measured against the vehicle operator's past performance.

9. The method of claim 1, wherein:
   storing a benchmark value comprises deriving the benchmark value as a common value for a fleet of vehicle operators such that at least one vehicle operator is measured against the fleet of vehicle operators.

10. The method of claim 1, further comprising:
   deriving at least one detail level metric in part from the information received from the plurality of industrial vehicles, and in part from data obtained or otherwise generated by the server computer.

11. The method of claim 1, further comprising communicating information to the user interface such that the user interface visually displays at least one annotation adjacent to a label for the summary level category where each displayed annotation is derived from received industrial vehicle information that is utilized in determining the value of the associated summary status indicator.

12. The method of claim 1, further comprising communicating information to the user interface such that the user interface visually displays the benchmark value assigned for the select detail level metric as a visual chart when the corresponding detail level metric is selected for viewing.

13. The method of claim 1, wherein assigning a value for each intermediate level and summary level comprises:
threading the results from the comparison of the select detail level metric against the assigned benchmark to the corresponding intermediate status indicator value; and
threading the corresponding intermediate status indicator values to the associated summary status indicator.

14. The method of claim 1, wherein assigning a value for each intermediate status indicator and the summary status indicator comprises:
defining three states including a normal state, an intermediate state, and an alert state, further comprising:
associating a first visual metaphor with the alert state;
associating a second visual metaphor with the intermediate state;
associating a third visual metaphor with the normal state; and
visually displaying the visual metaphor associated with the state of each of displayed summary and intermediate status indicator.

15. The method of claim 14, further comprising:
using rules for setting a first benchmark level and a second benchmark level, so as to define a benchmark threshold range;
assigning the normal state when the associated detail metric evaluates below the benchmark threshold range;
assigning the intermediate state when the associated detail metric evaluates within the benchmark threshold range; and
assigning the alert state when the associated detail metric exceeds the corresponding threshold range.

16. The method of claim 1, further comprising:
incorporating a page function into at least one detail metric so that a user navigating the dashboard can initiate communication with an operator of an associated industrial vehicle that generated data related to the detail metric being analyzed.

17. The method of claim 1, wherein analyzing, by the server computer, the detail level metrics, comprises:
applying the analysis based upon at least one user-defined preference.

18. The method of claim 1, wherein characterizing the received information according to an organizational structure further comprises:
providing at least one additional intermediate level that does not have a corresponding intermediate level indicator.

19. The method of claim 1, wherein communicating dashboard information to a user interface comprises:
navigating to a desired detail level such that the corresponding intermediate level and associated intermediate status indicator remain visible on a corresponding display device as the evaluation result of the underlying detail level metric is graphically displayed.

20. The method of claim 1, wherein communicating dashboard information to a user interface comprises:
integrating controls into the view of detail level metrics such that a user can modify filters so as to dynamically change the manner in which the detail metric is analyzed.

* * * * *